(12) United States Patent
Sadeh-Koniecpol et al.

(10) Patent No.: US 9,373,267 B2
(45) Date of Patent: Jun. 21, 2016

(54) METHOD AND SYSTEM FOR CONTROLLING CONTEXT-AWARE CYBERSECURITY TRAINING

(71) Applicant: Wombat Security Technologies, Inc., Pittsburgh, PA (US)

(72) Inventors: Norman Sadeh-Koniecpol, Pittsburgh, PA (US); Kurt Wescoe, Pittsburgh, PA (US); Jason Brubaker, Mechanicsburg, PA (US); Jason Hong, Pittsburgh, PA (US)

(73) Assignee: Wombat Security Technologies, Inc., Pittsburgh, PA (US)

( * ) Notice: Subject to any disclaimer, the term of this patent is extended or adjusted under 35 U.S.C. 154(b) by 0 days.

(21) Appl. No.: 14/215,981

(22) Filed: Mar. 17, 2014

(65) Prior Publication Data

US 2014/0199663 A1    Jul. 17, 2014

Related U.S. Application Data

(63) Continuation-in-part of application No. 13/442,587, filed on Apr. 9, 2012, and a continuation-in-part of application No. 13/832,070, filed on Mar. 15, 2013, now Pat. No. 9,280,911, which is a continuation of (Continued)

(51) Int. Cl.
*H04L 29/06* (2006.01)
*G06F 21/55* (2013.01)
(Continued)

(52) U.S. Cl.
CPC ............... *G09B 19/00* (2013.01); *G06F 21/55* (2013.01); *G06F 21/552* (2013.01); *G06F 21/554* (2013.01); *G06F 21/56* (2013.01); *G06F 21/562* (2013.01); *G06F 21/563* (2013.01);

(Continued)

(58) Field of Classification Search
CPC .............. H04L 63/145; H04L 63/1408; H04L 63/1416; H04L 63/1425; H04L 63/1433; H04L 63/1441; H04L 63/1458; H04L 63/1466; H04L 63/1475; H04L 63/1483; H04L 63/1491; G06F 21/55; G06F 21/56; G06F 21/552; G06F 21/554; G06F 21/562; G06F 21/563; G06F 21/564; G06F 21/565; G06F 21/566; G06F 21/567
USPC .................................. 726/11, 22, 23, 24, 25
See application file for complete search history.

(56) References Cited

U.S. PATENT DOCUMENTS 6,634,887 B1  10/2003  Heffernan, III et al.
7,325,252 B2 *  1/2008  Bunker et al. .................. 726/25

(Continued)

OTHER PUBLICATIONS

Kumaraguru et al., "Protecting People from Phishing: The Design and Evaluation of an Embedded Training Email System", 2007, In Proceedings of the SIGCHI Conference on Human Factors in Computing Systems.

(Continued)

*Primary Examiner* — Nikolai A Gishnock
(74) *Attorney, Agent, or Firm* — Fox Rothschild LLP

(57) ABSTRACT

A context-aware training system senses a user action that may expose the user to a threat, such as a cybersecurity threat. The system selects a training action from a collection of available training actions and causes the training action to be delivered to the user or a group of users. The system includes an administrator interface that enables an administrator to select, customize and/or assign constraints to the training action that will be delivered to the user(s).

28 Claims, 16 Drawing Sheets

Related U.S. Application Data application No. 13/442,587, filed on Apr. 9, 2012.

(60) Provisional application No. 61/793,011, filed on Mar. 15, 2013, provisional application No. 61/473,384, filed on Apr. 8, 2011, provisional application No. 61/473,366, filed on Apr. 8, 2011.

(51) Int. Cl.
  *G06F 21/56* (2013.01)
  *G09B 19/00* (2006.01)
  *G09B 5/00* (2006.01)

(52) U.S. Cl.
  CPC ............ *G06F21/564* (2013.01); *G06F 21/565* (2013.01); *G06F 21/566* (2013.01); *G06F 21/567* (2013.01); *G09B 5/00* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/1475* (2013.01); *H04L 63/1483* (2013.01); *H04L 63/1491* (2013.01)

(56) References Cited

U.S. PATENT DOCUMENTS

| | | | |
|---|---|---|---|
| 7,457,823 B2 | 11/2008 | Shraim et al. | |
| 8,046,374 B1 | 10/2011 | Bromwich | |
| 8,205,255 B2* | 6/2012 | Benea et al. | 726/23 |
| 8,220,047 B1* | 7/2012 | Soghoian | H04L 51/14 709/206 |
| 8,266,320 B1 | 9/2012 | Bell et al. | |
| 8,423,483 B2 | 4/2013 | Sadeh-Koniecpol et al. | |
| 8,464,346 B2* | 6/2013 | Barai | H04L 63/1433 380/200 |
| 8,468,244 B2 | 6/2013 | Redlich et al. | |
| 8,532,970 B2 | 9/2013 | White et al. | |
| 8,608,487 B2* | 12/2013 | Huie | G06Q 10/107 434/433 |
| 8,615,807 B1* | 12/2013 | Higbee et al. | 726/25 |
| 8,635,703 B1 | 1/2014 | Belani et al. | |
| 8,719,940 B1* | 5/2014 | Higbee et al. | 726/24 |
| 8,751,629 B2 | 6/2014 | White et al. | |
| 8,769,684 B2* | 7/2014 | Stolfo et al. | 726/23 |
| 8,819,825 B2* | 8/2014 | Keromytis et al. | 726/24 |
| 8,966,637 B2 | 2/2015 | Belani et al. | |
| 2005/0183143 A1* | 8/2005 | Anderholm | G06F 11/32 726/22 |
| 2006/0037076 A1 | 2/2006 | Roy | |
| 2006/0075024 A1 | 4/2006 | Zircher et al. | |
| 2006/0253906 A1* | 11/2006 | Rubin et al. | 726/23 |
| 2007/0112714 A1* | 5/2007 | Fairweather | 706/46 |
| 2007/0180525 A1 | 8/2007 | Bagnall | |
| 2007/0226796 A1 | 9/2007 | Gilbert et al. | |
| 2007/0245422 A1* | 10/2007 | Hwang | G06F 21/31 726/26 |
| 2007/0271613 A1* | 11/2007 | Joyce | 726/23 |
| 2008/0052359 A1* | 2/2008 | Golan | G06Q 10/107 709/206 |
| 2008/0167920 A1* | 7/2008 | Schmidt et al. | 705/7 |
| 2008/0222734 A1* | 9/2008 | Redlich et al. | 726/26 |
| 2008/0254419 A1 | 10/2008 | Cohen | |
| 2008/0288330 A1 | 11/2008 | Hildebrand et al. | |
| 2009/0144308 A1 | 6/2009 | Huie et al. | |
| 2009/0158430 A1* | 6/2009 | Borders | 726/23 |
| 2009/0319906 A1* | 12/2009 | White et al. | 715/736 |
| 2009/0320137 A1* | 12/2009 | White | G09B 19/0053 726/25 |
| 2010/0010968 A1* | 1/2010 | Redlich et al. | 707/3 |
| 2010/0146615 A1* | 6/2010 | Locasto et al. | 726/11 |
| 2010/0235918 A1 | 9/2010 | Mizrahi et al. | |
| 2011/0238855 A1 | 9/2011 | Korsunsky et al. | |
| 2012/0124671 A1* | 5/2012 | Fritzson | G06F 21/577 726/26 |
| 2013/0232576 A1* | 9/2013 | Karnikis et al. | 726/24 |
| 2014/0115706 A1* | 4/2014 | Silva et al. | 726/23 |
| 2014/0157405 A1* | 6/2014 | Joll et al. | 726/22 |
| 2014/0165207 A1* | 6/2014 | Engel et al. | 726/25 |
| 2014/0201836 A1* | 7/2014 | Amsler | 726/23 |

OTHER PUBLICATIONS

Kumaraguru et al., "Testing PhishGuru in the Real World", In Proceedings of the 2008 Symposium on Usable Privacy and Security (SOUPS 2008).

Kumaraguru, et al., "Lessons From a Real World Evaluation of Anti-Phishing Training", 2008 Anti-Phishing Working Group e-Crime Researchers Summit.

Sheng, et al., "Anti-Phishing Phil: The Design and Evaluation of a Game That Teaches People Not to Fall for Phish", Symposium on Usable Privacy and Security (SOUPS) 2007, Jul. 18-20, 2007, Pittsburgh, PA, USA.

Mitrovic, et al., "Evaluation of a Constraint-Based Tutor for a Database Language", International Journal of Artificial Intelligence in Education (1999), 10, 238-256.

Anderson et al., "A Development System for Model-Tracing Tutors", Nov. 18, 2008, Department of Psychology, Paper 78, Carnegie Mellon University Research Showcase.

Fette et al., "Learning to Detect Phishing Emails", World Wide Web Conference Committee, May 8-12, 2007, Banff, Alberta, Canada.

* cited by examiner

| Short Sensor Description | Possible Implementation |
| --- | --- |
| Dangerous program sensor | Based on signatures of programs known to be dangerous |
| Attachment sensor | Looking at saved attachment directory |
| Configuration sensor | Detects specific OS, browser and email client on a given machine to possibly tailor relevant training |
| WiFi roaming sensor | Keeps track of WiFi access points user attaches to & determines whether they are off/on corporate network |
| Locator | Analyzes IP address or collect WiFi or even GPS locations (depending on client) |
| Phishing website sensor | Determines if user frequently visits sites that have been blacklisted/recently taken down |
| Password change sensor | Detects when users are due to change their passwords (e.g. based on corporate policy or based on some heuristic) |
| USB device sensor | Raises an event when a USB drive is connected |
| Social networking sensor | Senses amount of time spent on social networking sites |
| Social data sensor | Scans social networks to see how much information an employee has posted |

FIG. 4

2010 Threat Scenarios & Indicative User Actions

| 2020 Threat Scenario | 2030 Relevant Sensed User Actions |
|---|---|
| Download malware from malicious USB | Insert USB in computing device; Open files downloaded from a USB |
| Connect to rogue wireless service | Connect to public Wi-Fi network |
| Disclose sensitive information | Post to Social Network |
| Call phone # included in malicious SMS message | SMS messages received from senders not in the user's contacts list; Clicking on links in SMS messages |

2000

Sensed User Data

| User | 2030 Sensed User Action | Date |
|---|---|---|
| User 1 | Clicked on link in SMS message | 12/12/2012 |
| User 1 | Post to Social Network | 2/12/2012 |
| User 1 | Post to Social Network | 2/13/2012 |
| User 2 | Connect to public Wi-Fi network | 12/14/2011 |
| User 2 | Changed Password | 1/2/2010 |
| User 2 | Opened PDF Viewer | 1/13/2012 |
| User 2 | Used Browser Plugin | 1/27/2012 |

FIG. 5

Sample Training Needs Model with Threshold Levels

| 2020 Threat Scenarios | 2030 Sensed User Action | 3010 Threshold Level | 3020 Training Needs |
|---|---|---|---|
| Download malware from malicious USB | Insert USB in computing device | More than once per month | Malware (High), Safe Browsing (Medium) |
| Download malicious app | Download fake malicious app by scanning a QR code | Once | Malware (High), Safe Browsing (Medium) |
| Connect to rogue wireless service | Connect to unsecured or out of office access point | More than once per week | Network security (High), Safe Browsing (Medium) |
| SMS mock attack | Call fake malicious phone number in mock SMS attack | Once | Messaging (High), Smart Phone Security (Medium) |
| Bluesnarfing | User carries bluetooth discoverable device | Once | Bluetooth security (High), smartphone security (medium) |

FIG. 6

Sample Elements of Quantitative Training Needs Model Based on Risk Estimates

| 2020 Threat Scenario | 4010 Cost Per Incident |
|---|---|
| Open a Malicious Attachment | $1,000 |
| Infect Computer with a Virus | $500 |
| Disclose Personal Information | $10,000 |
| Fail for Phishing Email | $4,500 |

| Threat Scenarios | Sensed User Action | Frequency Thresholds | 24 Hour Susceptibility (Untrained) | 1 Week Susceptibility (Untrained) | 24 Hour Risk (Untrained) | 1 Week Risk (Untrained) |
|---|---|---|---|---|---|---|
| Open a Malicious Attachment | Request Blacklisted Website | Less than once per month | 0.001 | 0.005 | $1.0 | $5.0 |
| | | More than once per month | 0.005 | 0.025 | $5.0 | $25.0 |
| | Open Email Attachment | Less than 3 times per day | 0.001 | 0.005 | $1.0 | $5.0 |
| | | More than 3 times per day | 0.004 | 0.02 | $4.0 | $20.0 |
| Disclose Personal Information | Post on Social Networking Sites | Less than twice per week | 0.00005 | 0.00035 | $0.5 | $3.5 |
| | | More than twice per week & less than 8 times per day | 0.0005 | 0.0035 | $5.0 | $35.0 |
| | | More than 8 times per day | 0.002 | 0.014 | $20.0 | $140.0 |
| Fail for Phishing Email | Open Email Attachment | Less than 5 times per day | 0.001 | 0.005 | $4.5 | $22.5 |
| | | More than 5 times per day | 0.004 | 0.02 | $18.0 | $90.0 |
| | Request Blacklisted Website | Less than once per month | 0.002 | 0.01 | $9.0 | $45.0 |
| | | More than once per month | 0.007 | 0.035 | $31.5 | $157.5 |
| | Read Email from Smart Phone | Yes | 0.003 | 0.021 | $13.5 | $94.5 |

FIG. 7

Sample Meta-Data Elements to Help Select and Prioritize Training Interventions

| 22 Available Training Interventions | Training Need Covered (Threat Scenario) | Risk Reduction (Per Threat Scenario) 1 week | Risk Reduction (Per Threat Scenario) 1 month | User Time Required | Prerequisite | 508 Compliance |
|---|---|---|---|---|---|---|
| URL Parsing Training Game | Infect Computer With a Virus | 75% | 55% | 6 min | None | Yes |
| | Disclose Sensitive Information | 80% | 60% | | | Yes |
| Mock Phishing Attack | Infect Computer With a Virus | 95% | 75% | 2 min | None | Yes |
| | Disclose Sensitive Information | 80% | 60% | | | Yes |
| Email Security Training Cartoon #25 | Disclose Sensitive Information | 25% | 5% | 1 min | None | No |
| Email Security Training Game | Infect Computer With a Virus | 50% | 35% | 8 min | None | Yes |
| | Disclose Sensitive Information | 50% | 40% | | | Yes |
| Smart Phone Security | Install Malicious App | 75% | 65% | 10 min | Module 101 | Yes |
| | Fall for SMS Phishing attack | 75% | 80% | | | Yes |
| | Have Phone Stolen | 75% | 80% | | | Yes |
| | Disclose Location on Social Network | 75% | 70% | | | Yes |
| | Bluetooth Attack | 75% | 80% | | | Yes |

FIG. 8

METHOD AND SYSTEM FOR CONTROLLING CONTEXT-AWARE CYBERSECURITY TRAINING

CROSS REFERENCE TO RELATED APPLICATIONS

This patent application claims priority to U.S. Provisional Patent Application No. 61/793,011, filed Mar. 15, 2013, titled Context-Aware Training Systems, Apparatuses and Methods.

This patent application also claims priority to, and is a continuation-in-part of, U.S. patent application Ser. No. 13/442,587, filed Apr. 9, 2012, entitled Context-Aware Training Systems, Apparatuses and Methods, which in turn claims priority to: (i) U.S. Provisional Patent Application No. 61/473,384, filed Apr. 8, 2011 and entitled Behavior Sensitive Training System; and (ii) U.S. Provisional Patent Application No. 61/473,366, filed Apr. 8, 2011 and entitled System and Method for Teaching the Recognition of Fraudulent Messages by Identifying Traps Within the Message.

This patent application also claims priority to, and is a continuation-in-part of, U.S. patent application Ser. No. 13/832,070, filed Mar. 15, 2013, entitled Context-Aware Training Systems, Apparatuses and Methods, which in turn claims priority to U.S. patent application Ser. No. 13/442,587 and the provisional applications described above.

This document fully incorporates each of the patent applications listed above by reference.

BACKGROUND

This document pertains generally to context-aware cybersecurity training and, particularly to training systems, apparatuses, and methods that select and provide cybersecurity training to a user based on action of a user.

Computer-based training systems and other forms of electronically supported learning and teaching (generically referred to as e-Learning systems) have traditionally relied on one-size-fits all training material, where the same collection of modules has to be taken by everyone. These modules may come in many different forms, including videos, flash-based presentations, simulations, training games and more. Independently of their format, they traditionally follow a fixed curriculum, where a predefined sequence of modules is prescribed for groups of individuals. Intelligent tutoring systems have introduced more sophisticated forms of computer-based training, where one develops and refines models of what the learner knows, and dynamically adapts learning content presented to the learner as these models evolve. When well designed, these systems have been shown to result in better outcomes than more traditional training modules.

This document describes methods and systems that address at least some of the issues described above, or additional issues.

SUMMARY

In an embodiment, a cybersecurity training system trains a user on procedures and actions relating to computer security attacks. The system includes at least one processor, and one or more data storage devices that store one or more training interventions and training needs models. The system also includes a computer-readable memory portion holding programming instructions that, when executed, instruct one or more processors to implement a policy manager that analyzes data relating to at least one user by applying the training needs model to the data to determine whether the user or users may be at risk for a threat scenario. The policy manager also identifies, from the at least one training intervention, a set of one or more system-selected training interventions that are relevant to the threat scenario. The system also includes a computer-readable memory portion holding programming instructions that, when executed, instruct one or more processors to implement a system administrator interface that displays the set of one or more system-selected training interventions and receives a selection of an intervention in the set from an administrator. The system also includes a computer-readable memory portion holding programming instructions that, when executed, instruct one or more processors to generate a command to deliver the administrator-selected training intervention to the at least one user.

In some embodiments, the instructions that implement the system administrator interface also include instructions to receive a customization of the administrator-selected training intervention from the administrator. The instructions that implement the system administrator interface also may include instructions to perform one or more of the following: (i) display parameters of the training needs model and receive a customization of the training needs model from the administrator; (ii) display logic of the policy manager and receive a configuration of the policy manager from the administrator; or (iii) display analysis results from the policy manager and receive a manipulation of the analysis results from the administrator.

Optionally, the instructions to implement the system administrator interface also may include instructions to cause the system administrator interface to display statistics for additional users and receive, via the system administrator interface, a selected group of the additional users. If so, the system may include instructions that, when executed, cause the system to generate a command to deliver the administrator-selected training intervention to the selected group of additional users.

In embodiments where the threat scenario includes an SMS attack threat scenario, then when receiving a customization for the administrator-selected training intervention the administrator interface may display various mock SMS attack templates, receive an administrator selection of one of the displayed mock SMS attack templates, and apply the customization to the administrator-selected template so that the customization comprises one or more of any of the following: (i) automatic insertion of the user's name in the administrator-selected template; (ii) a selected start time or end time for the administrator-selected training intervention; (iii) information obtained from a social network or public profile that is relevant to the user; or (iv) an administrator-edited SMS message.

In embodiments where the threat scenario includes use of a malicious memory device, then when receiving a customization for the administrator-selected training intervention the system administrator interface may display various mock malicious memory device attack templates, receive an administrator selection of one of the displayed templates, and apply the customization to the administrator-selected template so that the customization includes a selection of mock malware to include on at least one memory device that will be used in the training intervention. The customization in this embodiment may include any of the following: one or more locations at which the devices are to be delivered; a selection of mock malware to include on the devices; or other customizations.

Optionally, the system administrator interface may display identification information for additional users. For example, the system administrator interface may display user statistics so that the administrator can have the statistics presented, sorted and/or compiled according to administrator-selected criteria. The administrator interface may receive a selected group of the additional users, and it may receive the customization such that different mock attacks are provided to various members of the selected group. If so, the system may include instructions to generate a command to deliver the administrator-selected training intervention with the customization to the selected group of additional users.

Optionally, the system administrator interface may include a user interface portion that enables the administrator to select one or more scheduling constraints for the administrator-selected training intervention, and one or more additional users to whom the administrator-selected training intervention will be delivered. If so, the system may generate a command to deliver the administrator-selected training intervention to the additional users in accordance with the scheduling constraints.

In another embodiment, a security training system includes one or more data storage devices that maintain at least one training intervention. The system also includes a processor that causes the system to provide a system administrator interface that displays a representation of a measurement of whether at least one user may be at risk of a threat scenario; identifies one or more of the training interventions that are relevant to the threat scenario; displays the identified one or more training interventions; receives an administrator selection of one of the displayed training interventions; receives a customization for the administrator-selected training intervention; and generates a command to deliver the administrator-selected training intervention with the customization to the at least one user.

Optionally, in this embodiment the system administrator interface may display identification information for additional users; receive a selected group of the additional users; and generate a command to deliver the administrator-selected training intervention with the customization to the selected group of additional users. The system administrator interface also may enable an authorized administrator to select one or more scheduling constraints for the administrator-selected training intervention, and also identify one or more additional users to whom the administrator-selected training intervention will be delivered. The system may then generate the command to deliver the administrator-selected training intervention with the customization to the selected group of additional users in accordance with the scheduling constraints.

In an alternate embodiment, a cybersecurity training system includes a processor, one or more data storage devices that store at least one training intervention and training needs model, and a computer-readable memory portion holding programming instructions that, when executed, instruct one or more processors to implement a policy manager that analyzes data relating to at least one user by applying the training needs model to the data to determine whether the at least one user may be at risk for a threat scenario. This embodiment also includes a computer-readable memory portion holding programming instructions that, when executed, instruct one or more processors to implement a system administrator interface that is configured to perform at least one of the following actions: (i) display parameters of the training needs model and receive a customization of the training needs model from the administrator; or (ii) display logic of the policy manager and receive a configuration of the logic from the administrator. Upon completion of at least one of the actions of the system administrator interface, the system may select one or more of the training interventions that are relevant to the threat scenario and generate a command to deliver the selected training intervention to one or more users. The system administrator interface also may be configured to perform at least one of the following actions: display the one or more selected training interventions and allow the administrator to select a subset to be delivered; or receive from the administrator a customization of one of the training interventions to be delivered.

Other embodiments, which may include one or more parts of the systems or methods described above, are also contemplated, and may thus have a broader or different scope. Thus, the embodiments in this Summary are mere examples, and are not intended to limit or define the scope of the invention or claims.

Accordingly, the methods and systems described in this document provide solutions to various shortcomings of prior training systems and methods. Other details, features, and advantages will become further apparent in the following detailed description.

BRIEF DESCRIPTION OF THE FIGURES

The accompanying drawings, which are incorporated herein and constitute part of this specification, and wherein like reference numerals are used to designate like components, include one or more embodiments of the invention and, together with a general description given above and a detailed description given below, serve to disclose principles of embodiments of behavior sensitive training.

FIG. 4 illustrates one example of a collection of cyber security training sensors that may be used in a context-aware cybersecurity training system and ways in which those sensors can be implemented.

FIG. 5 illustrates an embodiment of a partial list of possible threat scenarios a context-aware cybersecurity training system may monitor.

FIG. 6 illustrates an embodiment of a partial training needs model based on simple threshold levels.

FIG. 7 illustrates elements of another embodiment of a training needs model.

FIG. 8 illustrates elements of an embodiment of a context-aware cybersecurity training system.

DETAILED DESCRIPTION

Figure 1:
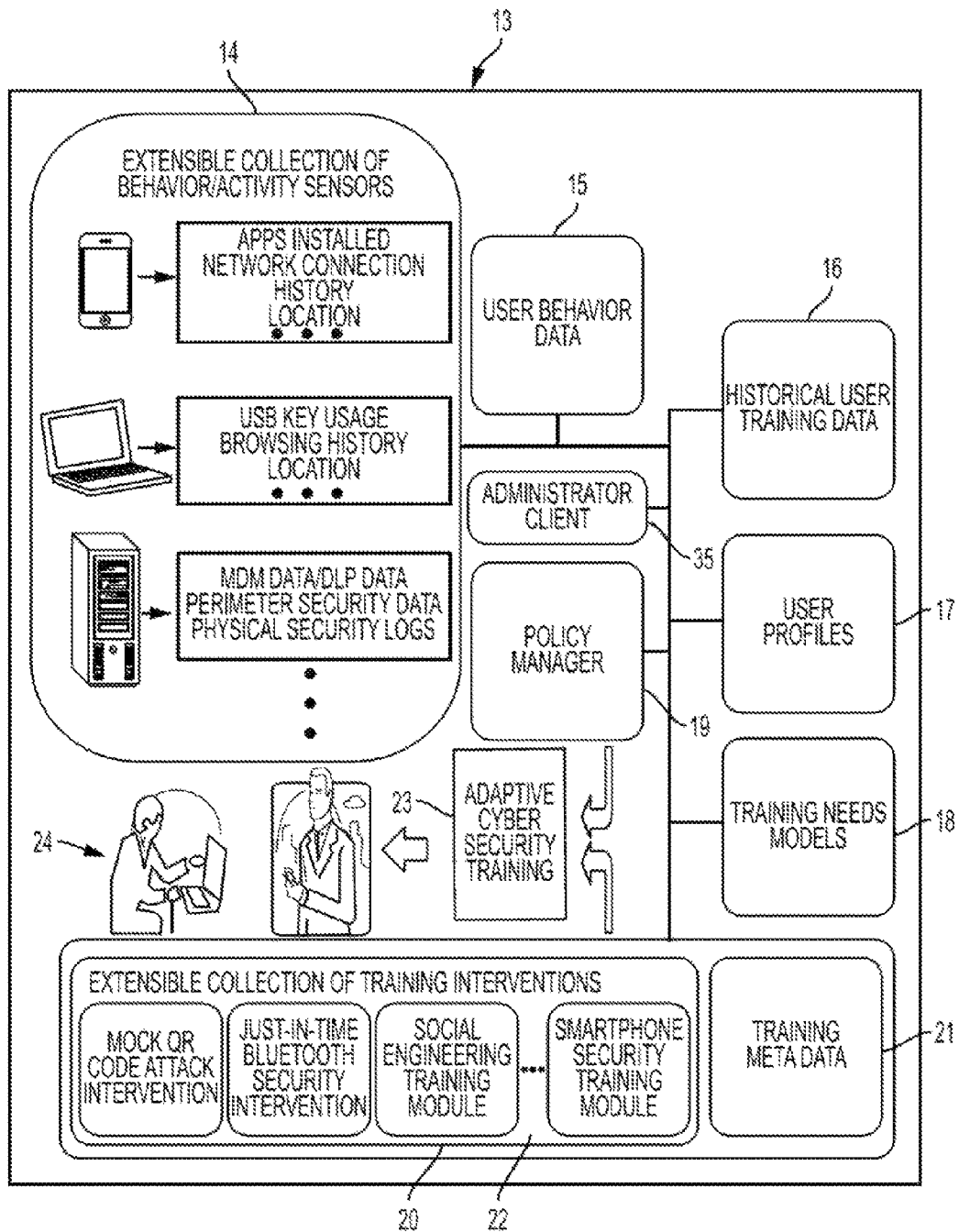
FIG. 1 illustrates one example of a configuration of a context-aware cybersecurity training system.

This document describes various embodiments involving context-aware training systems, apparatuses, and methods. It will be appreciated that these embodiments and implementations are illustrative and various aspects of the invention may have applicability beyond the specifically described contexts. Furthermore, it is to be understood that these embodiments and implementations are not limited to the particular compositions, methodologies, or protocols described, as these may vary. The terminology used in the following description is for the purpose of illustrating the particular versions or embodiments only, and is not intended to limit their scope in the present disclosure which will be limited only by the appended claims.

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments. References to "or" are furthermore intended as inclusive, so "or" may indicate one or another of the ored terms or more than one ored term.

This document describes computer based training systems that may enable an administrator to trigger, or may allow the system to sense and use activity or behavior information in combination with user needs models that map those activities or behaviors onto quantitative or qualitative estimates or metrics indicating how critical it is for users engaging in these particular activities and behaviors to be knowledgeable of and proficient in different topics or training areas. The systems and methods may selectively prioritize those areas where the learner needs to be trained and selectively identify conditions where delivery of the training is likely to be most effective. That level of customization may be particularly valuable in domains where training content is vast or opportunities for training are limited (e.g. limited time), and where the training required by individual users varies based on their activities and behaviors. One such domain is cybersecurity training. Identifying training needs based on static information (e.g. based solely on the department an employee works for, or his/her level of education) is often insufficient in these domains. Sensing activities, behaviors, or other contextual attributes can help enrich the data available to identify and select training needs, resulting in more targeted training, better training outcomes and more effective mitigation of consequences associated with undesirable user behaviors.

In some embodiments, the methods and systems described below may sense user behavior and activity, such as a user response to mock attacks, to determine user susceptibility to different types of cybersecurity threats and selectively identify training interventions that will be presented to individual users. The ability to tailor the cybersecurity training interventions presented to different users based on their susceptibility to different threats makes it possible to make better use of users' limited attention span when it comes to receiving cybersecurity training. This can be especially valuable as the number and types of threats to users can potentially be exposed to is large and continues to grow.

When delivered, a training intervention can take many different forms. Training interventions may be provided as soon as a particular event is sensed (e.g., a just-in-time training intervention) or may be provided for later delivery to a user. A just-in-time training intervention should not be confused with a warning about a potential threat currently facing the user. In contrast to a warning which focuses on reducing risk associated with a situation that is at hand or about to occur (e.g., a user about to initiate a dangerous action), a training intervention is intended to also impart the user with some tips, best practices principles or other knowledge likely to help reduce future risk. This may include training the user to avoid repeating the same mistake, avoid engaging in the same risky behavior in the future, or more generally training the user to recognize and avoid risky situations in the future. Simply telling the user that he is about to be put at risk or instructing him to not do something in a one-off manner does not equate to a training intervention.

Various embodiments of context-aware training are directed to apparatuses, systems, and methods performing context-aware training. It will be appreciated by those skilled in the art, however, that a computer system may be assembled from any combination of devices with embedded processing capability, for example, computer, smart phone, tablet or other devices, including mobile or pervasive computing devices or appliances, electromechanical devices, and the like. The computer system can be configured to identify training interventions (or "training actions") relevant to individual users and push those training interventions to users, both pro-actively (in anticipation of future needs) or reactively (in response to a need as it arises).

Numerous specific details are set forth in the specification and illustrated in the accompanying drawings to provide an understanding of the overall structure, function, manufacture, and use of embodiments of context-aware training. It will be understood by those skilled in the art, however, that the invention may be practiced without the specific details provided in the described embodiments. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined by the appended claims.

FIG. 1 illustrates an embodiment of a context-aware training system 13. That embodiment of the context-aware training system comprises one or more sensors 14, user behavior data 15, historical user training data 16, static user profiles 17, training needs models 18, a policy manager 19, training content data 20, training meta-data 21, an extensible collection of user-oriented training content 22, an administrator client or console (or system administrator interface) 35, and rules and/or criteria for context-aware training 23 for delivery to a user 24.

The one or more sensors 14 monitor one or more aspects of a user's behavior or activities ("user actions"). Those user actions may include sensing the behavior of people other than the user (regardless of whether they are a user of the system), the behavior of other entities (e.g. organisms, organization, the environment) with which a given user interacts (e.g. sensing how they respond to actions by the user), and other relevant contextual attributes. Those sensors 14 as well as other elements of the training system may be operated by one or more entities and may be deployed across a wide range of geographies, including different jurisdictional boundaries. The sensors may be part of the system, or the system may rely on external sensors and simply analyze data that it directly or indirectly received from the sensors.

The system may receive user behavior or activity data 15 and record that data over time in one or more data storage devices. For example, the data may include relevant statistics relating to the user's activity over a period of time as received from the sensors. Those relevant statistics may include, for example, frequency of certain activities, frequency of certain behaviors, deviations from relevant baselines, and relevant trends.

The system may collect (as data received from the sensors) user behavior or activity data 15. The data may further be used in combination with historical user training data 16 which may be stored in one or more data storage devices and may include data related to the training one or more users have taken in the past. Historical user training data 16 may include information including when and how well one or more users performed in prior training or assessments. For example, static user profiles 17 which may include a role of one or more individual users in the organization, their education levels, or demographic information for example, and may be stored in one or more data storage devices 18, may be used in combination with the historic user training data.

The system may store one or more user training needs models 18 in one or more data storage devices. A training needs model can include data and/or a rule set that the system may apply to correlate one or more behaviors or activities with training that is relevant to those behaviors or activities. Training needs models 18 may be qualitative or quantitative in nature, and may include a mixture of both qualitative and quantitative aspects. Training needs models may take the form of user risk models and may vary in complexity, ranging from simple "if-then" rules, for example, that map patterns of sensed data with training content typically required by people whose activity or behavior matches a given pattern (e.g., "if the user falls for a mock barcode phishing attack, select a training intervention that immediately teaches the user how to protect himself against barcode phishing attacks"), to more complex quantitative models that, for example, taking into account considerations such as the probability that a user requires some type of training, the time it takes to take the training, the relative effectiveness of available training modules in addressing a training need, the type of a training a given user has taken in the past, the amount of time available to train the user and more. The system may include various training needs models that are customized or unique to a user or group of users, or the system may include standard training needs models that it may apply to any user. An example of this is described below in the context of FIG. 8.

The system may implement a policy manager 19, which may include computer-readable instructions to analyze user behavior data 15 subject to a relevant set of rules or other appropriate logic. The policy manager may use additional data such as: (a) historical user training data 16 for the user, other similar users, or both; or (b) static profile data 17 such as the role of the user and the education level of the user. Based on its analysis, the policy manager 19 may select one or more training interventions from an extensible collection of training intervention modules 22 (which may considered "context-aware training content"), or it may initiate activities aimed at collecting additional data about one or more users such as estimating their training needs in different area through the creation of mock situations, the assignment of quizzes, or some other available option. The policy manager 19 may perform its analysis in light of one or more relevant user training needs models 18. The system may then generate one or more instructions, commands or other outputs that cause selected training interventions 23 to be pushed or provided to the user 24, such as by sending a signal that includes the training intervention or causing a display to display details about the selected training intervention so that a human can implement it.

Training content data 20 may be organized in the form of an extensible collection of training modules 22 and training metadata 21. The extensible collection of training modules 22 may range from very short training interventions intended to be delivered in a just-in-time fashion, to longer, more extensive training modules that users may be encouraged or required to be taken within a predetermined period of time. Training interventions 22 along with relevant training metadata 21 may be stored in one or more data storage devices. Relevant training meta-data 21 for a training intervention may include information about the training needs the training intervention is designed to address, the format in which the training intervention can be delivered, the amount of time the training intervention typically requires, estimated effectiveness of the training intervention (possibly across all users or possibly for a subset of users based on considerations such as level of education, age, gender, prior training to which the users have been exposed) and other relevant considerations. The training meta-data 21 may include annotations and those annotations may be used by a policy manager 19 to select training content that is most appropriate for one or more users and when to provide that training content to the user or user group. Some training interventions may also be customizable based on relevant contextual information, such as the activities the user is engaged in, time available to train the user, available devices to deliver the content, preferred user language, demographic information and other contextual information. In the cybersecurity training domain where a user's time is limited and there is an increasingly vast amount of cybersecurity best practices and strategies to which the user should ideally be exposed, the policy manager 19 may be able to use its input to identify and possibly prioritize one or more training interventions 22 in a way that will minimize, or at least help reduce, the chances users fall prey to those threats to which they are most susceptible based on their activities, behavior, training history and/or other relevant contextual attributes.

The policy manager 19 may operate autonomously or according to a mixed initiative mode. In a mixed initiative mode, a system administrator (e.g. a security analyst, a member of human resources in charge of training, or some other role in an organization) uses an administrator client to interact with the policy manager. In the mixed initiative mode, the system administrator may review results of the analysis conducted by the policy manager 19 and select one or more training interventions to address those training needs for which one or more users are at a particularly high risk. In that embodiment, the system administrator could launch a training campaign based on a special purpose cartoon to train all those employees who are scheduled to take their corporate laptops out of the country in the next two weeks because, based on the system's training needs model, those employees have been identified as being at a particularly high risk for laptop-related threat scenarios by the analysis conducted by the policy manager 19.

The extensible collection of training interventions can change over time. For example, the system may include a user interface that enables an administrator to add, delete, or modify some or all the training interventions. The system may receive training interventions from different sources including, for example, corporate training developed in-house, external training interventions provided by vendors, training interventions obtained via personal subscriptions, and training interventions offered by service providers such as a doctor, a dietician, or a health club. In addition to the possibility that training interventions may vary over time, available sensors and other sources of contextual information may also vary over time. For example, a user may acquire a new mobile phone with additional sensors, new data about the user may be collected by a new source, and a new source of data may become able to interface with the context-aware training system.

Sensed data about user behavior and activities can include activities conducted in cyber space, activities in the physical world or a combination thereof. Sensed data may include any activity or behavior that can be tracked, observed, or recorded in some manner, for example, driving behavior, table manners, physical, mental and social health-related activities and habits, professional activities, social activities, etc. Sensed data may also include data relating to the behavior of people (not necessarily users of the system) with whom the user interacts in some manner. For example, sensed data may include responses received by the user from people, organisms, objects, surrounding elements or other entities with whom the user interacts, whether directly or indirectly.

Sensed data may also be provided by a system administrator via an administrator client 35. An administrator client 35 may be software, or hardware that is running software, to provide a user interface by which an administrator may add details that should be included in or applied to a user risk model or more generally a training needs model. Such sensed data could also include information such as the scheduled deployment of corporate smart phones. Such sensed data, when processed by the policy manager 19 based on training needs models, can help anticipate the need to train employees in the area of smart phone security and can result in the assignment of smart phone security training interventions to those employees.

One or more sensors 14 can include one or more devices, artifacts or other sources of information. For example, sensors 14 can include hardware, software, electromechanical devices, bio-sensory devices, and sources of information provided by third parties. Sensors 14 can be used to sense one or more aspects of a user's activities or behavior. Whether in the context of routine activities or in response to artificially created situations, Examples of mock situations or exercises that the system may create or enable an administrator to select to evaluate a user's response in a cybersecurity context include:

i. sending a mock message (e.g. SMS, MMS, instant message, in-channel message delivered by a service such as a social networking site, or a message delivered using some other messaging technology such as WhatsApp) to a user (e.g. a mock phishing message with a mock phishing URL or a mock malicious attachment, or a mock phishing phone number, or a mock request for sensitive information);

ii. a mock social networking attack involving a mock malicious post or update such as a post or update containing a mock phishing URL (including a URL that relies on one or more levels of redirection), mock malicious attachment (e.g. a mock malicious picture, video, audio clip), a mock phishing phone number, or a mock barcode (e.g., QR Code®) that when read by a barcode scanner causes the computing device to access or download mock malicious code;

iii. giving a mock social engineering call to a user (including using a computer system to automatically place the mock phone calls and interact with the user through an automated menu or some automated dialogue functionality such as Interactive Voice Recognition technology, multi-modal interactive technology, VoIP technology, automated speech recognition technology, some other automated dialogue functionality) with the call requesting the user to provide sensitive information or to initiate a possibly sensitive activity (e.g. granting someone access to a resource, resetting someone's password, telling or requesting a colleague to do something, sending information to a colleague, installing malicious code, entering erroneous information in a computer system), instructing a colleague to ignore a warning, enticing someone to spread false information, or generally engaging in any other activity that could compromise the user's security or reputation, that of his organization or his country or that of some other people, organization or country;

iv. leaving a memory device such as a universal serial bus (USB) storage device on which mock malware is stored in a location where a user may be lured to pick up the device and plug it into a computer, giving a USB or other memory device on which mock malware is stored to users to plug into their computer, dropping some other portable memory device such as a DVD or an SD card with mock malware for users to possibly pick up and access from one of their computers, giving some other portable memory device such as a DVD or an SD card with mock malware for users to access from one of their computers;

v. placing a two-dimensional barcode (such as a quick-response QR Code® or other matrix code) or some other type of bar code on an object such as a poster or wall so that the code, when scanned by a mobile electronic device or some other computer device, causes the device to be directed to a mock phishing website or initiate the download of mock malware on that computer device;

vi. placing near field communication (NFC) tags, short-range communication tags or equivalent tags on objects with the tags when read by a mobile device or some other computer device, causing the device to be directed to a mock phishing website or initiating the download of mock malware on the device;

vii. placing fake malicious apps in an app store with the app when installed on a computer device;

viii. mock rogue Wi-Fi access points to lure users to connect via these mock rogue access points;

ix. using some other mock attack to entice (i.e., lure) users to do any of the following: access fake malicious websites; install fake malware on one of their computer devices; open malicious message attachments; disclose sensitive or dangerous information in a mock context; engage in some other activity that has the potential of putting them, their organization, their country, others, other organizations or other countries at risk or of damaging their reputation; fail to engage in some activity that, if not implemented, could have similarly deleterious consequences; or x. repurposing an actual attack by making it harmless (e.g. replacing a phishing link with a mock phishing link, replacing a malicious attachment with a mock malicious attachment) and using the resulting attack as a mock attack to estimate the user's vulnerability to similar attacks.

Examples of how an administrative user may select, or the system may select and implement, a mock situation will be described below. The system's proposed landing page may allow such a training intervention can be customized by a console administrator, starting from a template associated with a given type of attack scenario. In general, similar training interventions can be created and customized, whether manually or automatically (e.g. automatically inserting the user's name or attributes of a particular mock attack). This is not limited to the creation of landing pages but can also include other forms of just-in-time training such as an SMS message being used to deliver training, an image being sent via Bluetooth to a smartphone or tablet (e.g. mock bluejacking attack), a message being displayed by a mock malicious app, an automated phone call, an email message, etc.

Examples of behavior or activity sensors 14 in the cyber security training domain include sensors that detect attachments in emails sent or received by a user, sensors to determine whether one or more users access different services over secure connections, sensors to identify the number, type and/or identity of applications installed on a user's mobile phone, and sensors to track the locations, including Internet web pages, a user visits. Some sensors 14 can also include, for instance, sensors to detect USB key usage, record browsing history, identify Bluetooth headset use, sensors that detect the number or types of emails received, sensors that inspect the content of emails, and sensors that track the physical location of users.

The sensors 14 can be embedded in or interface with smart phones, laptop computers, desktops, tablets, e-readers, body parts, or any other devices, appliances or elements of the user's local or global environment (e.g. smart home, smart car, smart office, or other mobile or pervasive computing device or appliance, including medical devices, water quality sensors, surveillance cameras, and other environmental sensors). A sensor 14 may include a data storage device or processor, for example in microprocessor form, and can obtain data provided by the user, by people other than the user, by organizations, or by entities including colleagues, friends, family members, strangers, doctors. A sensor 14 can alternately or in addition obtain data provided by systems (including data aggregated and synthesized from multiple sources, including aerial sensors, space-based sensors, implanted devices, and medical devices). For example, a sensor 14 may sense calendar information, status updates on social networks, and credit card transactions and can sense information or actions obtained through video surveillance. Some sensors 14 may also sense a combination of data. Some sensors 14 may also sense that the user has fallen for a mock attack, including any of the mock attacks identified above.

The system may receive and analyze data from any or all of such sensors and use the data to determine whether the user is at risk of a threat scenario. Examples of how the system may receive and analyze sensor data will be described in more detail below. As an example of how the system may sense data, if the user is provided a memory device on which an executable fake malware file is stored, when the user uses the device (by inserting it into a computing device's port) or attempts to open the file, the fake malware may execute or cause the device to execute a command to send a message to the training system. The message may include data such as time and/or date of execution, an identification code for the computing device to which the memory is connected, and/or network identification data for a communication network to which the computing device is connected. As another example, if the message is an SMS phishing message, the message lure the user into taking an action by including a phone number for the user to call, or it may contain a hyperlink to or address for a website, or it may contain an attachment such as an executable file. The system may sense whether or not the user took an unsafe action by monitoring for a communication from the website operator, the phone number operator, or the user device itself indicating that the user accessed the website, called the phone number, or downloaded and executed the attachment.

User behavior data 15 can be captured and recorded in one or more locations and may include relevant statistics, such as frequency associated with different types of events or situations, trends, and comparisons against relevant baselines. Such user behavior data 15 may help create a unique profile for each individual user that captures this user's activities and behaviors at a particular point in time or over different periods of time.

Historical user training data 16 may inform the selection of relevant training for a user by capturing the training history of that user. Historical user training data 16 may include information such as: the training modules to which that user has already been exposed, how often and when that user was exposed to training modules, how well the user responded when taking the training modules, and other indicators of the user's proficiency in the area or areas in which the user has been trained. User proficiency can include, for example, recorded instances where the user failed to conform to expected best practices or apply relevant knowledge covered by the training system.

For example, if the training intervention involved luring the user with a USB memory device that contained fake malware, the system may include in the historical training user data the information on whether or not the user used that memory device within a period of time. Similarly, if the training intervention involved a fake SMS message, the system may include in the historical user training data an indicator of whether or not the user acted upon the message, such as by calling a phone number with which the system is associated, or by visiting a website to which the message includes a hyperlink. The operator of the website to which the user links or the phone number that the user calls may serve as a sensor who will then provide information about the user, such as the user's phone number or electronic device identifier, to the training system for inclusion in the historic user training data and/or analysis by a policy manager.

An example of a domain that can benefit from sensing user behavior is cybersecurity training and awareness for everyday users. The complexity of today's computers, including cell phones, tablets and other computer-powered or Internet-enabled devices, and networking systems make them vulnerable to an ever-wider range of attacks. Human users who adopt best practices and strategies (e.g. not falling for Internet-enabled social engineering attacks, regularly checking and installing software patches, adopting safe browsing practices, safe USB memory practices, safe password management practices, etc.) can often help reduce their exposure to many of those threats. Training everyday users to adopt improved strategies that address potential threats can be a daunting task. Accordingly, an effective way to mitigate risks is to prioritize training for individual users based on the threats to which they are most likely to be exposed by taking into account information about user activities or behaviors and/or other relevant contextual attributes such as their prior training history and level of expertise.

Figure 2:
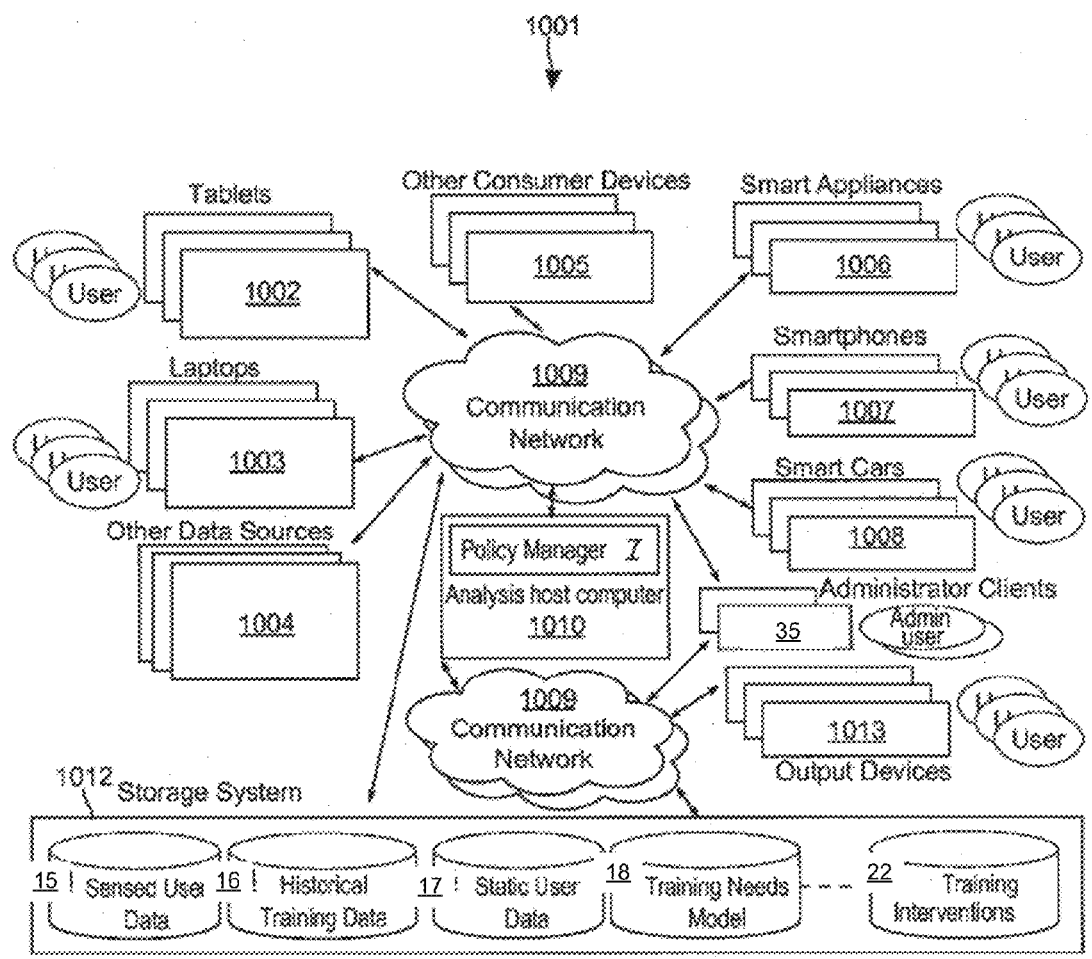
FIG. 2 illustrates a hardware configuration for an embodiment of a context-aware cybersecurity training system.

FIG. 2 illustrates a simplified view of a hardware configuration 1001 of a context-aware training system that may be used to facilitate the sensing and analysis of user activities and behaviors. The context-aware training system may perform one or more embodiments of the methods discussed and generally herein. Thus, any of the methods provided herein may be, in various embodiments, performed using a processor of one or more of the computers of the system 1001. The configuration may include an analysis host computer 1010 connected via one or more communications networks 1009 to one or more computing devices or other electronic devices, which may include:

i. devices capable of sensing relevant elements of a user's activities, behavior and more general context such as tablets 1002, laptop computers 1003, other consumer devices 1005 such as cameras, wristwatches, smart appliances 1006 including smart televisions and refrigerators, smartphones 1007, smart cars 1008, and other sensing devices not represented in the figure such as, for example RFID readers, heart rate monitors, cameras, and hardware and software sensors capable of sensing different types of activities and behaviors, including the effects of actions by the user on himself, other people, other organisms, or elements of his surrounding environment;

ii. other data sources 1004 such as social networks, satellite imagery, public records, company records, criminal records, health, and financial records; and iii. devices capable of delivering training interventions to users such as tablets 1002, laptop computers 1003, smart appliances 1006, smartphones 1007 and other types of output devices 1013.

In general, different training interventions may utilize different delivery devices, such as some just with output capability, others with different combinations of output and input functionality.

The system may include a storage system 1012, which may comprise a plurality of storage devices, including cloud-based devices, possibly located across a plurality of locations. The storage system 1012 may serve as repository for static user data 17, recorded data 15 collected from one or more sensors, historical user training data 16, and training needs models 18. The storage system 1012 may also store part or all of the training content 22 and training meta-data available to the context-aware training system.

The computers 1002, 1003, 1007, 1010 and other devices 1005, 1006 and artifacts 1008, 1013 may be computers, computer systems or other electronic as described above and may each include at least one processor and possibly one or more other components of a computer or network of computers. For example, the analysis host computer 1010 may be a single server or could be a distributed computing platform or a cloud-based system running software such as Microsoft Windows, Linux or UNIX. The client configuration, participant computers, which may include one or more laptops 1003, tablets 1002, smart phones 1007, one or more administrator client devices 1014 or output devices 1013, may themselves comprise a collection of participant computers capable of network connectivity. Those devices may support any number of input and output functions. Those input and output functions may be embedded in the devices themselves or may be provided by satellite hardware such as a keyboard, mouse, display, or speaker. Devices may be connected to the network either through a physical hardwire connection or through wireless technology such as 802.11 Wi-Fi, Bluetooth, NFC, or GSM/CDMA/LTE cellular networks, or through other communication methods or systems. The operating system of each participant computer could include Microsoft Windows, Linux, UNIX, Mac OSX, Android, iOS, PALM, or another operating system. When relevant the computing devices may run browser software such as, for example, Mozilla, IE, Safari, Chrome or another browser software or browsing methodology. The type and configuration of the participant computing devices (e.g. 1002, 1003, 1007, and 1010) can be otherwise configured as desired.

The communication networks 1009 could be any type of data or computer communication network or any other technology enabling computers and possibly other devices or appliances to communicate with one another.

Figure 3:
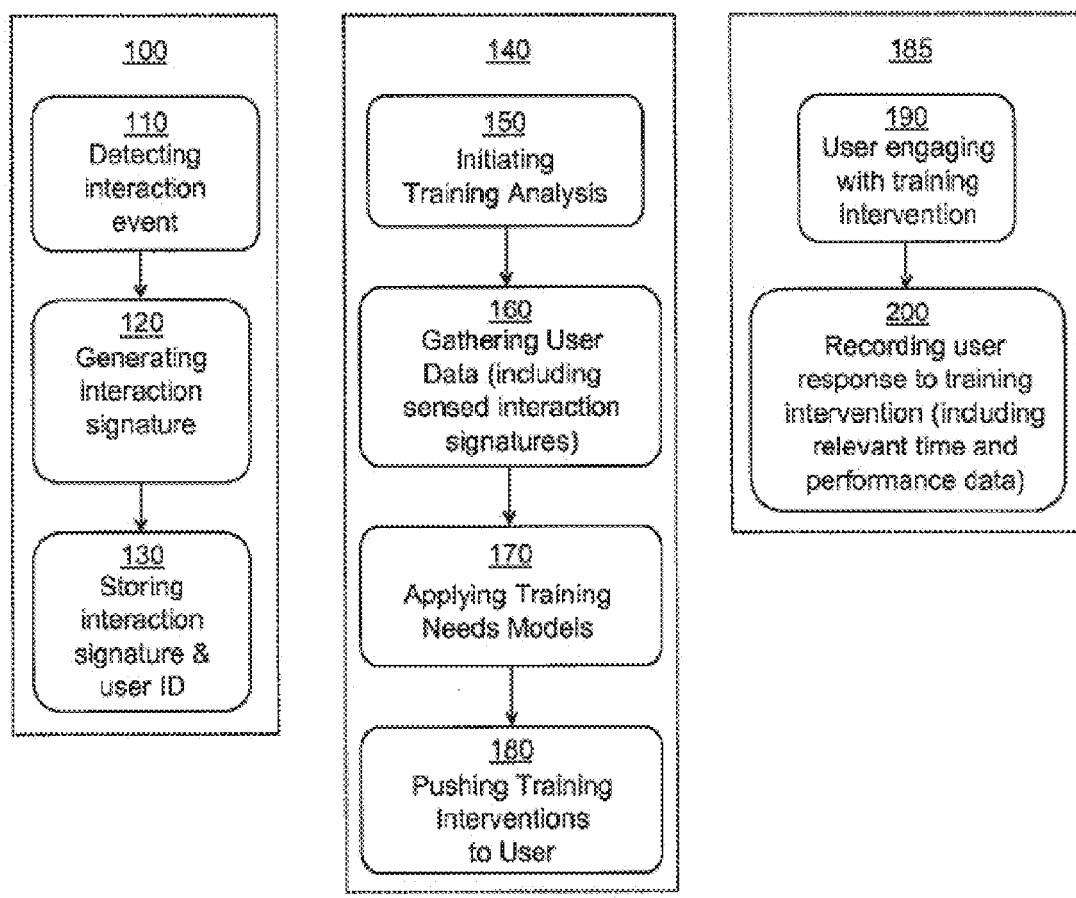
FIG. 3 illustrates an embodiment of context-aware cybersecurity training workflows.

One embodiment of a method of context-aware training that may be performed, for example, by one or more of the components illustrated in FIG. 2, is illustrated in FIG. 3. Three processes are illustrated in that embodiment: a user action process 100, a policy management process 140 and a response process 185. The system may run these processes sequentially or concurrently. The user action process 100 may include the collection of user activity data. The policy management process 140 may implement programming logic that determines whether to initiate, and which also initiates, training interventions. The response process 185 includes steps in which the system detects the user's interaction with the training intervention.

The user action process includes detecting an interaction event at 110. When detecting an interaction event at 110 in this embodiment, a sensor detects the interaction event or the system may receive data that is collected by a sensor. The data may correspond to user activities or behaviors or, more generally, other contextual attributes relevant to the training available. Such contextual attributes may include any relevant sensory data as well as information obtained from other relevant sources of information, such as browser history, credit card records, surveillance cameras, electronic doors, employment records, information collected about a person with which the user has interacted, and social networking information. In one instance, a software or executable program will run on a participant computer or device and locally process sensed data to detect one or more relevant interaction events prior to forwarding the detected information (e.g. in the form of interaction signatures) to a storage system. In some embodiments, user data can be forwarded directly to the analysis host computer. The storage system may be responsible, among other things, for storing sensed user data. The system may detect an interaction event 110 by filtering sensed data, aggregation of sensed data, pre-processing of the sensed data, analysis of the sensed data, and/or receipt of one or more event interaction signatures 120.

Continuing references to FIG. 3, the user action process may include generating an event interaction signature at 120, though in some embodiments raw sensor data may be stored, as shown at 130, or directly forwarded to the analysis host computer. An event interaction signature may include, for example, a communication sent by an executable mock malware file indicating that the file was executed on a user computer. As another example, an event interaction signature may include a communication from a website operator or phone number operator indicating that the user has accessed the website or phone number. The event interaction signature may include information that identifies the user or the user's computing device (such as by phone number or device ID), time data, duration data, and optionally information about the user's interaction with the event (such as any photos or text that the user provided to the system monitored by the sensor during the event). The interaction signature can be produced in various ways including using cryptographic hash functions. In some embodiments, sources of sensory data may forward sensed information to one or more other participant computing devices.

The interaction signature, sensed information and, when appropriate, the identity of the user to which the interaction signature corresponds, may be forwarded to a storage system 1012 responsible, among other things, for storing sensed user data at 130. In other embodiments of the method of context-aware training, sensed information may be directly communicated to an analysis host computer 1010 responsible for hosting the policy manager functionality enabling the policy manager to immediately analyze the sensed information based on relevant training needs models.

The policy management process 140 includes initiating training analysis at 150 and, when appropriate, identifying one or more relevant training interventions from a collection of available training interventions, including possibly just-in-time training interventions. The policy manager is responsible for determining, and possibly prioritizing, the training content to be pushed to individual users. The policy manager in this embodiment initiates a training analysis process 150 for one or more users and collecting relevant user data 160 that may be beneficial in conducting the training analysis 150. Gathering user data 160 may include accessing static user data and sensed user data. Sensed user data may include relevant contextual data, whether obtained directly from a sensing device or participant computer, or whether obtained from parts of a storage system storing sensed user data. Gathering user data 160 may also include retrieving relevant historical training data, retrieving relevant training needs models (to the extent that they are not stored locally on the analysis host computer 1010), and/or retrieving training meta-data about available training interventions. The Policy Manager applies training needs models to determine which training interventions to push to the user and, when relevant, how to prioritize these training interventions.

Referring again to FIG. 1, embodiments of the policy manager 19 may operate according to one or more modes. Those policy manager modes include scheduled modes, routine modes, real-time modes, mixed-initiative modes and combinations thereof. In an embodiment of context aware training in which a scheduled mode is utilized, the policy manager 19 regularly assesses the overall training needs of a plurality of individual users and reprioritizes training content to be pushed or delivered to each individual user. In some embodiments, that process may be fully automated. In other embodiments, that process may follow a mixed-initiative mode, where an administrative user (e.g. a system administrator, a member of personnel in charge of training, an analyst or some other suitable person, including possibly the user himself) reviews, via an administrator client, analysis results produced by the policy manager. Based on the analysis results produced by the policy manager 19, the system administrator may further select or prioritize training interventions that will be delivered to one or more users. The system administrator may include a user interface that allows a human user to schedule, select, define or modify a training intervention, as well as to select which user or users should receive the training intervention.

In particular, for example, the system administrator may launch a training campaign for a group of users whose estimated training need in a given area is above a certain threshold level. In another instance, a system administrator could select all those users who failed recent assessments via one or more mock phishing attacks and who also regularly read email using their smart phones, to be exposed to a cyber security training intervention intended to teach them how to better protect themselves from phishing attacks. Such a training intervention could also include the system administrator or policy manager 19 identifying groups of users who are perceived to be at particularly high risk for a combination of threat scenarios and scheduling training campaigns for those users involving one or more training interventions that specifically address those training needs.

Regular assessment of user training needs may involve running in batch mode, where all users are being reviewed in one batch or where different groups of users are processed in different batches, possibly according to different schedules. Regular assessment of user training needs may also include pushing short security quizzes and creating mock situations aimed at better evaluating the needs of an individual user or a group of users. In a real-time mode, the policy manager 19 may operate in an event-driven manner enabling it to more rapidly detect changes in user behavior or activities and other relevant contextual attributes, and to more quickly push training interventions that reflect the risks to which the user is exposed at a desired time. Any of those modes can be implemented in the form of simple rules or more complex logic that can potentially be customized and refined by an organization where, for instance, the organization is using administrator client software interfaces 35.

The rules or more complex logic can also be defined to allow for mixed initiative iterations with system administrators and users, where results from the analysis performed by the policy manager 19 are shown to the user and the user can interact with the policy manager 19 to refine the analysis, evaluate different options, and possibly finalize the selection, prioritization and scheduling of training interventions, whether for individual users or groups of users. The rules and/or logic of the policy manager 19 may be manually configured by system administrators, who may include analysts, programmers or other qualified personnel (whether working for the organization providing the context-aware training system, for a customer organization, for a contractor working for either of those organizations, or by some other individual or group of individuals) or derived through statistical analysis or data mining techniques, or a combination of both. The administrator client software interface may also allow administrators to maintain and customize training needs models and other relevant parameters (such as the threshold levels, training needs and other parameters shown in FIGS. 6 and 7), data elements and elements of functionality of the context-aware training system. Maintenance and customization may include updating and customizing the collection of available training interventions, and updating and customizing individual training interventions, including associated meta-data (e.g. prerequisites, compatible delivery platforms, required time, effectiveness and other meta-data). Maintenance and customization may also include accessing, reviewing and manipulating other relevant system data, including static user data, sensed user data, historical training data, and other meta-data.

Returning to FIG. 3, once relevant training interventions have been identified by the policy manager for one or more users, those interventions may be delivered or pushed to the user at 180. Delivery of training interventions, which may include training content, may be performed in a number of ways, including sending relevant training interventions directly to one or more output devices capable of delivering the identified interventions to the user. Delivering training interventions may also be performed by updating a schedule indicating when training interventions should be delivered or otherwise exposed to the user, or updating a schedule that will be exposed to the user, possibly with a combination of required and recommended training content for engagement by the user. For example, the system may generate a command to send an SMS phishing message to a user at a specific time, and the system may then cause an automated SMS message to be transmitted to the user's mobile device at a determined time. Optionally, the system may ensure that it sends the SMS message via an outgoing phone number that has been appropriately "whitelisted" to ensure delivery to the user's device. As another example, the system may provide a human administrator with instructions for making fake malware-containing memory devices available. If so, it may provide the administrator an interface by which the administrator may download the fake malware file(s) onto the memory device(s), or it may cause an order to be placed for fake malware-containing memory devices to be delivered to the user.

Training interventions may include one or more dates by which the user should experience the training intervention, proficiency levels that may have to be achieved by the user while engaging with the training content (e.g. training quiz, training game, simulation exercise, responses to mock situations and other interactive types of interventions). Training interventions may also be performed through a combination of types of interventions including, for example, a delivery of a combination of just-in-time training interventions to the user, training assignments to be completed by the user by assigned dates or times, and recommendations for further training of the user. Training interventions, including training content, assignments, and recommendations, may also be provided to the user by other relevant means.

Training interventions may include the creation of mock situations, whether through fully automated processes (e.g. automated delivery of SMS phishing messages to a number of users), or manual processes (e.g. activating personnel responsible for creating mock situations such as mock impersonation phone calls intended to train people not to fall for social engineering attacks), or hybrid processes (e.g. mock USB memory attack, where a USB includes fake malware intended to train one or more users not to plug USB memory sticks into a computer and further wherein such USB memory devices are manually scattered around an office to lure employees to pick them up). Training interventions may come in many different formats, ranging from video and audio content, to cartoons, alerts (e.g. alarms, flashing lights), training interventions involving personnel (e.g. a phone call from the boss of a user, a training session with a certified instructor, a conversation with the parent of a user, a session with a dietician), or any combination of the above or any other relevant format by which training content may be delivered to a user.

In the response process 185, as users engage with the training interventions 190, their responses may be recorded in part or in whole 200. That response data itself may be analyzed in real-time by the policy manager or may be stored in an appropriate format, possibly for later analysis, (whether in raw form or in summarized form) in a part of the storage system responsible for storing historical training data or in a part of the storage system responsible for storing user behavior data, or some other relevant storage, or any combination of the above. Response data may include whether the user experiences the training, when the user experiences the training, how long the user takes to experience the training, whether the user's behavior changes after taking the training, the level of proficiency exhibited by the user while taking the training (e.g. in the case of an interactive training module), changes in the behaviors or responses of people the user interacts with after taking the training, or any other relevant data.

In some embodiments, the response collection process 185, data collection process 100 and/or the training intervention process 140 may be integral. For example, the data collection process and training intervention process can together be implemented as an "if-then" rule pursuant to which the system delivers a training intervention if the system detects that a user has fallen for a particular mock attack situation.

FIG. 4 illustrates an embodiment of a partial list of possible sensors that may be used in a context-aware cybersecurity training system. Some of the sensors listed in the figure are themselves aggregating data they collect from other sensors such as device drivers, browsers, operating system components, and more. User behavior data collected from those sensors may be directly interpreted by a policy manager running on an analysis host computer or can be recorded in a data storage system for later analysis.

In the case of an embodiment of a context-aware cybersecurity training system, sensed user data is analyzed to identify threat scenarios for which a user in a given context is most susceptible or most at risk.

For example, the system may include one or more executable programming instructions that serve as dangerous program sensors, instructing the processor to monitor incoming data and identify or report any signatures of programs downloaded by the user that are know to be or otherwise indicative of vulnerability to one or more threat scenarios. Examples could include instructions to identify dangerous mobile apps installed by a user on his smartphone, such as by accessing a database or known apps or analyzing certain properties of the app. Dangerous apps may be identified as apps that require dangerous permissions or dangerous combinations of permissions (e.g. an app requesting access to a user's contacts list and to phone call functionality, an app reporting the user's location when it does not require it), or apps that are unknown to the system. The system can could also include a sensor to monitor incoming data or processing actions to identify that the user has caused, installed, downloaded or acquired software requiring that the user opens up sensitive ports on his computing device, a sensor to identify that the user has caused, installed, downloaded or acquired software known to have vulnerabilities, or that the user has caused, installed, downloaded or acquired a software client associated with risky usage scenarios (e.g. peer-to-peer client software).

The system may include or receive data from a dangerous program sensor. It may receive information such as signatures of one or more programs that are known to be dangerous. The user may attempt to access such a program, such as by trying to click a link in an email, web page or SMS message that, when clicked will download the program. Alternatively, the user may install the program in a computer system via a storage device, such as a USB memory device from which the program will be launched with the device is installed in the computer. The system may analyze this information, such as a file signature or a message generated by the program, and select an appropriate training intervention relating to avoiding the installation of dangerous programs, as described below.

Other examples of sensed data may include, for example:
 i. filenames or other data relating to content of a user's saved file directory, such as a directory of saved email attachments;
 ii. data relating to the configuration of the user's browser and/or operating system;
 iii. data indicating whether the user is using or has used a computing device on a Wi-Fi network, and whether or not the Wi-Fi network is a secured network or known, trusted network;
 iv. location data, such as global positioning system (GPS) data or Wi-Fi network identification data where the user has traveled, or where the user has operated or attempted to access a particular computing system;
 v. a phishing sensor, such as a monitor that receives data indicating whether (and optionally how frequently) a user visits or attempts to visit one or more blacklisted web sites;
 vi. a password change sensor, such as a monitor that receives data indicating whether a user has changed a password in a manner that is consistent with one or more policies, such as a time-based password change policy (e.g., change every 90 days) or a strength-based password change policy (e.g., the password must contain a minimum number of characters or a certain type or combinations of types of characters, such as at least one capital letter, at least one lowercase letter, and at least one number;
 vii. an external memory device monitor that receives data from a computer indicating when an external memory device such as a USB memory device has been connected to a communication port of the computer so that information from the computer may be transferred to the device or information from the device may be transferred to or executed by the computer;

viii a social networking sensor, such as a monitor that receives data from a browser indicating a measurement of time that the user has spent accessing one or more known social networking websites; or ix. a social networking sensor, such as a monitor installed in the form of a browser plug-in, programming instructions that scrape data, or other monitors that assess the information (such as data files, photos, or text) a user has uploaded or otherwise provided to one or more known social networking site, and optionally an amount of the data or frequency at which the user provides such data.

FIG. 5 illustrates an embodiment of a partial list of possible threat scenarios 2020 for which a context-aware cybersecurity training system may determine that a user is at risk. The system may include a database of associations 2010 between threat scenarios 2030 and associated actions 2030 that may indicate that a person who performs the actions may be at risk or the threat scenario. Optionally, the system may receive sensed data relating to the user actions 2030 and apply rules to determine whether the user is at risk for the associated threat scenario. These rules may include analysis of the action itself (such as the content of information posted to a social network) to determine whether the action satisfies a threat criterion (which, in the case of a social network posting action, may include any content that identifies an employee by name, a social security number, a corporate name, or other prohibited content). Sometimes, to determine whether a user is at risk or has caused a risk of one or more threat scenarios 2020, the policy manager may require that a threshold plurality of indicative user actions 2030 be sensed, or that a particular user action 2030 be repeated a threshold number of times or achieve a certain frequency. For instance, assessment of the risk associated with a user falling for an SMS phishing threat scenario can benefit from monitoring activities that include how often a user replies to SMS phishing messages. The logic used to determine threshold and derive relevant rules for the analysis performed by the policy manager may be manually entered by an analyst or system administrator, may be derived using data mining techniques, may be obtained through benchmarking activities involving multiple organizations, or may be obtained via any combination of the above.

As also shown in FIG. 5, the system may receive sensed action data 2030 for multiple users and store that data in correlation with relevant attributes of the data, such as a date of the action, in a data set such as a user profile, user behavior data set, or historical user training data set.

An embodiment of a partial training needs model based on simple threshold levels is illustrated in FIG. 6. The model may associate various threat scenarios 2020 with various user actions 2030 that may be detected. When the system determines that a user action 2030 has been taken at least a threshold level of times 3010 in response to the threat scenario, the model will identify one or more training needs 3020 that should be provided to the user, optionally with priorities for the training needs. For instance, a user who replies to an SMS message from his smartphone is identified as being at a high risk of falling for a phishing attack in that embodiment. The training needs model associated with this particular threat scenario based on this particular combination of contextual attributes (in this case simply the fact that the user replied to an SMS message from an unknown source) indicates that the user is in a high need for being trained in the area of email security and smart phone security, the identified training needs 3020 associated with this particular threat scenario as identified for this particular user in this particular context.

A user may be identified as being at high risk for a number of different possible threat scenarios. In one embodiment, the policy manager is responsible for consolidating the training needs identified for the user and for identifying a suitable and possibly prioritized collection of training actions, based on considerations such as the collection of training interventions available for addressing the collection of training needs identified by the model.

Some training interventions can address more than one training need. For instance a smart phone security training module may address both smart phone security at large as well as phishing emails in the context of smart phones. Training actions selected by the policy manager may include immediate, just-in-time training interventions, assignments of training interventions the user should take by a certain date, and recommendations for additional training.

Elements of an embodiment of a slightly more complex training needs model 4000 including data based on one or more risk models is illustrated in FIG. 7. In this embodiment, the training risk model includes on estimates 4020 of the susceptibility of a given user to fall victim to a given threat scenario 2020 over a period of time. The susceptibility estimates 4020 may vary based on the different sensed activities 4040 and/or by established frequency thresholds 4050 above or below which the user may be considered at risk or likely not at risk for a particular threat scenario 4060. Susceptibility estimates 4020 can be probabilities, can be based on historical data, can be maintained by security analysts, and can be estimated with the help of data mining techniques. Susceptibility estimates can be maintained for different time horizons such as 24-hour 4020 and 1-week 4030 or other periods to help the policy manager 7 identify training interventions that could beneficially urgently be delivered to the user, and training interventions that can be assigned to be taken within a longer time window (e.g. a few days, a week or even a month). Twenty-four-hour susceptibility and one-week susceptibility estimates may be related in different ways. For instance, some activities may be performed 5 days per week, whereas others may be performed at different frequencies (e.g., 1 day per month or 7 days per week).

Elements of the quantitative training needs model 4000 illustrated in FIG. 7 combine estimates of susceptibility and estimates of the incident cost 4010 associated with different threat scenarios to compute the risk associated with each threat scenario and possibly individual training needs for a given user in a given context. The training needs model 4000 also may include one or more costs of providing the user with training in response to the user being at risk for a threat scenario. Using the model illustrated in FIG. 7, the policy manager can identify a combination of one or more training interventions that will best mitigate the various risks to which a given user is susceptible at a particular point in time. That identification may include prioritizing identified training interventions, including differentiating between interventions that should be delivered right away and interventions that can wait a bit longer before being exposed to the user.

The particular format of the risk models shown in FIG. 7 and FIG. 8 are illustrative of different types of training needs models envisioned in the invention. It will be appreciated by those skilled in the art that similar considerations can be captured through different quantitative and qualitative variations of the training needs model illustrated in FIG. 7 and FIG. 8. Format variations include variations that rely on different ways of breaking down model elements aimed at capturing probabilities, costs, risks and reductions in risk associated with exposing different training interventions to a user. For instance, FIG. 8 presents an embodiment of a risk model 5000 where a cost associated with exposing a user to a training intervention 22 is approximated by the average time 5010 it take user to take that training ("User Time Required"). A benefit of the intervention, such as a threat scenario addressed by the intervention 5030, or an expected risk reduction associated with the training intervention 5040, 5040 may be included in the model. Benefits may be approximated in the form of estimated risk reductions over a 1 week period 5040, a 1 month period 5050, or any other period following user exposure to training action 22. The model also may indicate whether one training intervention is a prerequisite for another intervention so that it may prioritize and/or order the interventions that the policy manager provides to the user. Those skilled in the art will readily appreciate that a number of other parameters may be used to approximate the costs and benefits associated with exposing a user to a training intervention, starting with simple models that may possibly ignore the cost and/or benefit altogether to significantly more complex models accounting for a wider range of costs (e.g. licensing fee required for a training intervention, cost of getting the user's attention, cost of the user getting habituated to receiving training via mock attacks) and a wider range of benefits (e.g. indirect benefit of a user's likelihood to share his newly acquired knowledge with other colleagues).

For instance, FIG. 8 presents an embodiment of the invention where the cost associated with exposing a user to a training intervention is solely approximated by the average time it takes a user to take that training ("User Time Required") and the risk reduction associated with the training intervention is only approximated in the form of estimated risk reductions over a 1 week period and a 1 month period following user exposure to training action. Those skilled in the art will readily appreciate that a number of other parameters may be used to approximate the costs and benefits associated with exposing a user to a training intervention, starting with simple models that ignore the cost and/or benefit altogether to significantly more complex models accounting for a wider range of costs (e.g. licensing fee required for a training intervention, cost of getting the user's attention, cost of the user getting habituated to receiving training via mock attacks, cost associated with other resources required to deliver the training such as battery life on a smartphone or revealing the identity of training personnel involved in delivering a mock attack) and a wider range of benefits (e.g. indirect benefit of a user's likelihood of sharing his newly acquired knowledge with other colleagues).

FIG. 8 further illustrates elements of an embodiment of a context-aware cybersecurity training system. Specifically, FIG. 8 illustrates parts of the data elements 5000 used by the policy manager 7 to combine results from its analysis based on training needs models with meta-data about available training needs interventions. The meta-data may include, for various training interventions 22, one or more types of threat scenarios 5030 the intervention is designed to address, the effectiveness of the intervention to reduce susceptibility to identified threat scenarios 5040, 5050, a cost 5010 such as the time it takes to deliver one or more training interventions to a user, the different access devices on which the training interventions can be delivered, a list of possible customization parameters (which may include, for example, elements of the training content, level of complexity, duration, and examples used to train the user), the expected medium and long-term retention of the knowledge the training intervention teaches, the languages in which the training intervention is available, whether the training intervention is available for visually impaired users, or a variety of other meta-data. Those skilled in the art will appreciate that many other considerations can be captured in such a model and that these considerations can be captured through different types of quantitative and qualitative models that can be exploited by the policy manager.

In another embodiment, a computer-implemented training system is contemplated in which a user computing device communicates with a remote analysis host computer. The computer-implemented training system includes an input device for receiving user input or a user action and a first processor coupled to the input device. The first processor has instructions which, when executed by the first processor, cause the first processor to receive a user initiated input from an input device, transmit an action associated with the input to a second processor, receive a training action from the second processor, and provide the training action to the user. The computer implemented training system may also receive at least one input provided at the input device in response to the provision of the training action and transmit the at least one input provided in response to the provision of the training action to the second processor.

In another embodiment in which a user computing device (i.e., 1002, 1003, 1005, 1006, 1007, and 1008 illustrated in FIG. 2) communicates with a remote analysis host computer 1010, the analysis host computer 1010 receives the user input or user action from the user computing device, determines whether a need for training is indicated by the user input or action, selects a training intervention appropriate for the user input or action, and transmits the training intervention to the first processor if a need for training is indicated by the user input or action. The analysis host computer may also receive feedback, which may be in the form of additional user inputs, from user interaction with the training intervention and may further transmit additional training interventions or training intervention feedback to the user computing device.

The user in embodiments of context-aware training could be a human user or, for example, a robot, a cyber entity, an organism, an organization, a trainable entity, or a group or subset of those users. Examples of cyber entities include intelligent agents, such as Siri on the iPhone, an avatar in a virtual environment, or a character in a computer game.

Examples of the training interventions and meta-data described in FIG. 8 include training interventions commercialized by Wombat Security Technologies (e.g. Wombat Security Technologies smart phone security training module, its Anti-Phishing Phil™ Training Game, its Anti-Phishing Phyllis™ Training Module, its training cartoons, its safe social networks training module, its email security training module, its password security training module, and its Security Beyond the Office module, and its PhishGuru™ training module. Relevant attributes, meta-data, user data, including historical training data, proficiency data and responses to mock attacks, may also include the type of data collected by Wombat Security Technologies Security Training Platform™.

Figure 9:
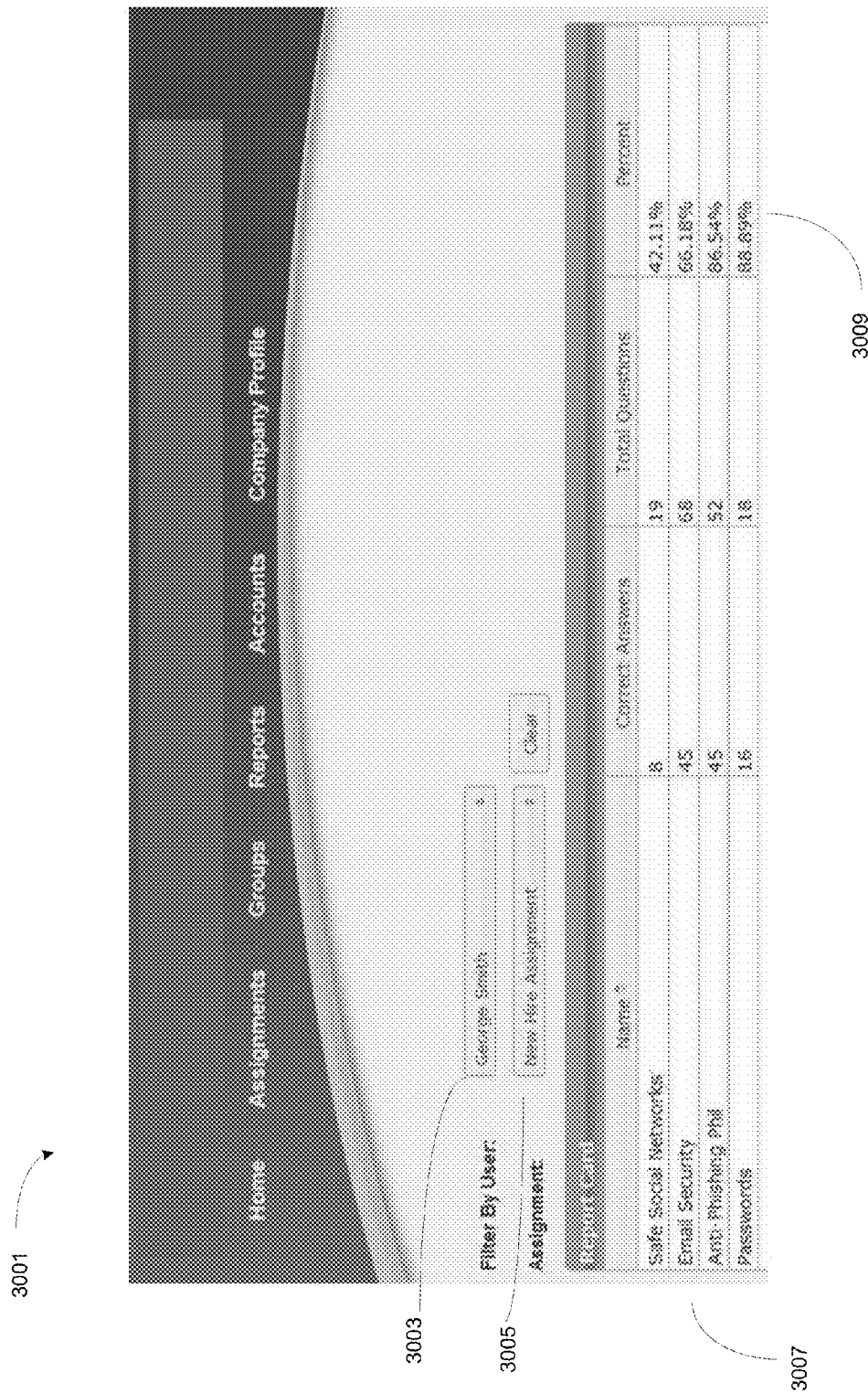
FIGS. 9-16 illustrate example pages and/or screens of one or more user interfaces via which an administrator may view and operate, and/or by which a user may receive, various features of a training system.

FIG. 9 depicts an embodiment of a screen of a system administrator user interface 3001 that displays examples of sensed historical training data collected about a user 3003 (identified as "George Smith"). In this example, user Smith was recently assigned a collection of training modules referred to as the "New Hire Assignment" 3005. The historical training data in this particular case shows that the user was assigned four training modules (safe social networks, email security, anti-phishing, and passwords) 3007 and has provided responses to the questions or other prompts included in the assigned training modules. The interface displays a summary of the type of historical training data collected by the platform, including in this case training relating to the threat scenarios of social network usage, email security, anti-phishing and password security 3009. This sensed data can in turn be used in combination with training needs models that rely on a user's likelihood of being at risk for a threat scenario. In this case, the measurement is a percentage of correct answers provided by the user while taking the training provided by a collection of the interactive training modules. It could also include responses to different mock attacks. The example screen shown in FIG. 10 allows an administrator user to select, view and filter statistics of user activity data according to different criteria. These criteria can include filtering by individual users or groups of users, by training assignment (such as the "new hire assignment" shown in FIG. 9), which can include a collection of training interventions, by specific training intervention, by training campaign, namely a collection of one or more training interventions assigned to a selected group of users. The system or the administrator may use this information 3009 to identify users at risk for different threat scenarios. An example can be as simple as identifying users with scores below a given threshold for a given threat scenario below. The administrator may then select (or the system may recommend to the administrator to select) training interventions using additional administrator features such as those described below. Under some conditions, the console and the policy manager can also be configured to automatically trigger such selection and some conditions may simply have embedded training rules in them. This can be used to provide just-in-time training when a particular situation is detected (e.g. a user falling for a fake malicious SMS attack (FIG. 14), a user connecting to a fake rogue Wi-Fi access point being warned on the spot to not connect to, and to verify the identify of, public Wi-Fi access points), yet allow the administrator and the policy manager to further review the sensed information and assign additional training interventions to further consolidate training (e.g. later assigning that same employee a more in-depth training module covering the risks associated with laptop use outside the office).

Figure 10:
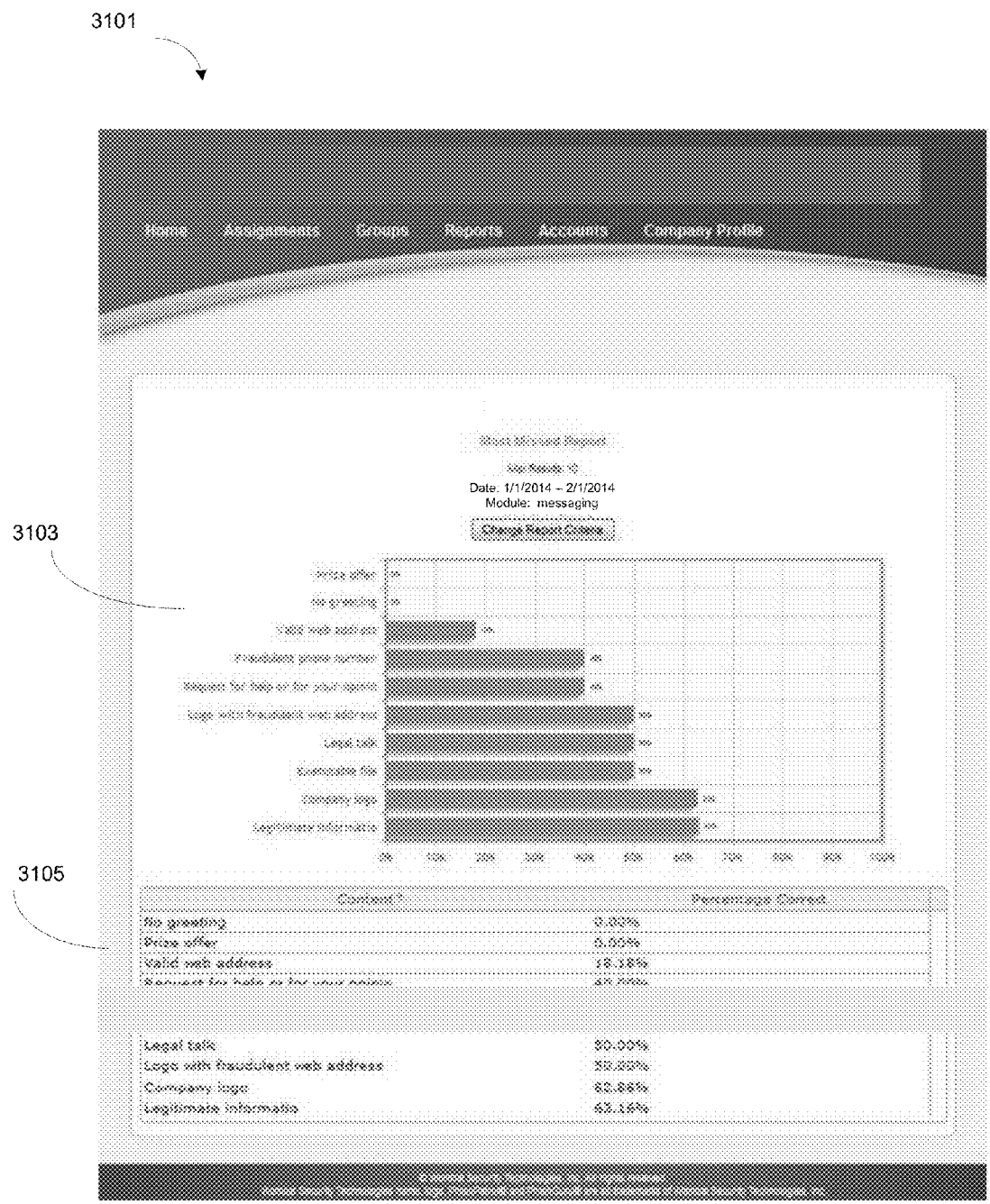

FIG. 10 illustrates a screen 3101 of an embodiment of an administrator interface that may display statistics for a population of users, such as those users who have taken a particular interactive training module or collection of modules, or users who have been subject to particular mock attacks. The statistics may include, for example, vulnerability data 3103 that shows a measurement of how many users fell for various types of mock attacks. It may also illustrate statistics 3005 representing user responses to various training modules or interventions. The administrator and/or system may use this information, which can be stored with historical training data or behavioral data, to benchmark individual users or groups of users and help determine which training interventions to direct to them later on based on training needs models. The system or administrator may also use this information to identify patterns such as correlations in the vulnerability of users to different types of threat scenarios. By comparing these statistics with baseline populations (e.g., employees at other companies, employees in other departments, same group of employees but at other times), the system can calibrate the need to train individual users or groups of users. This information may be incorporated in the system's training needs logic, where it can be used to support both automated and semi-automated processes. Statistics can be organized and presented according to taxonomies of training needs and training interventions (e.g. "mock phishing emails with fraudulent phone numbers", "mock phishing emails with prize offers", etc.). The interface may include user-selectable options that allow the administrator to have the statistics presented, sorted and/or compiled according to administrator-selected criteria such as particular training interventions, training modules or time windows.

Figure 11:
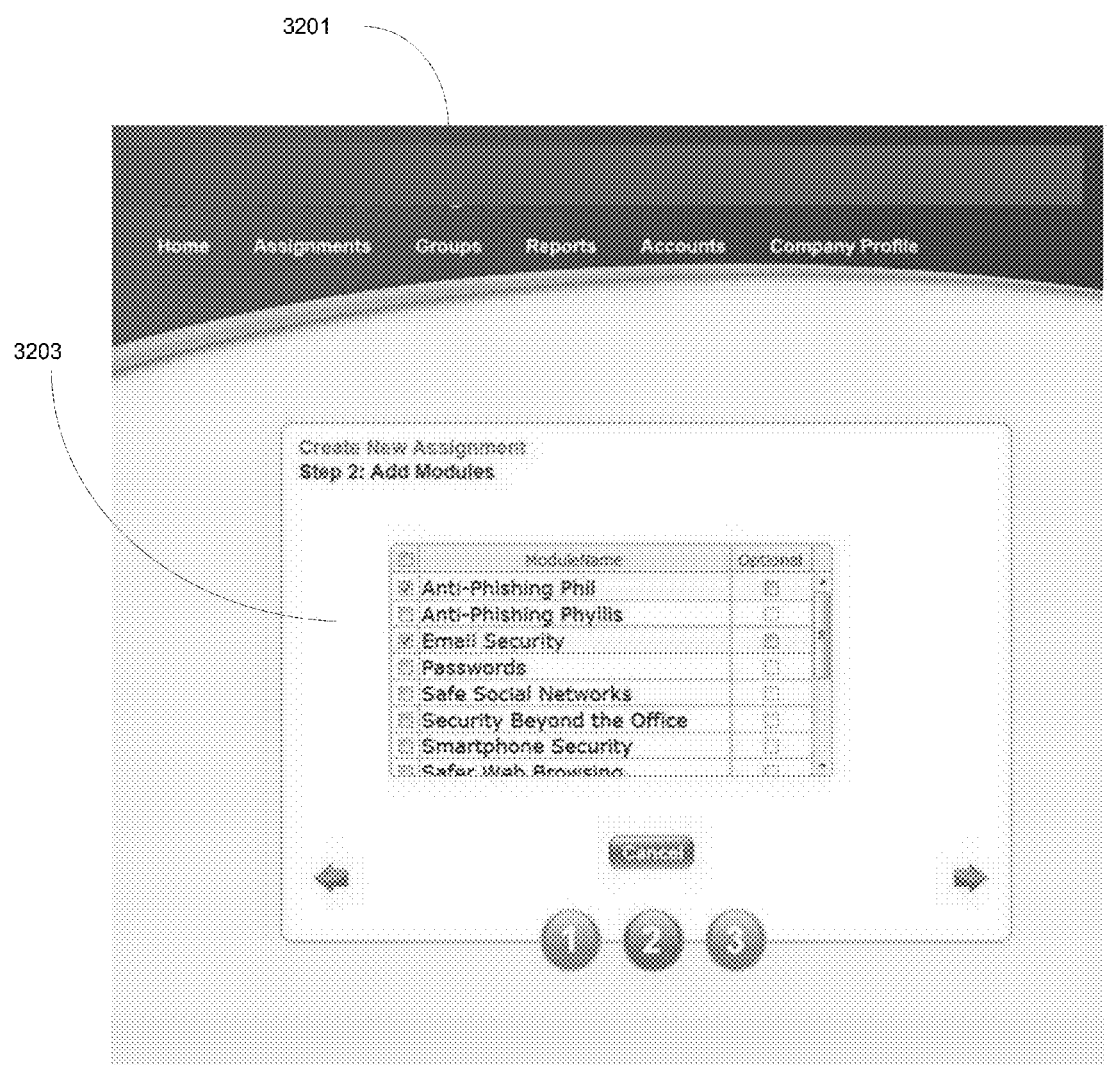
Figure 15:
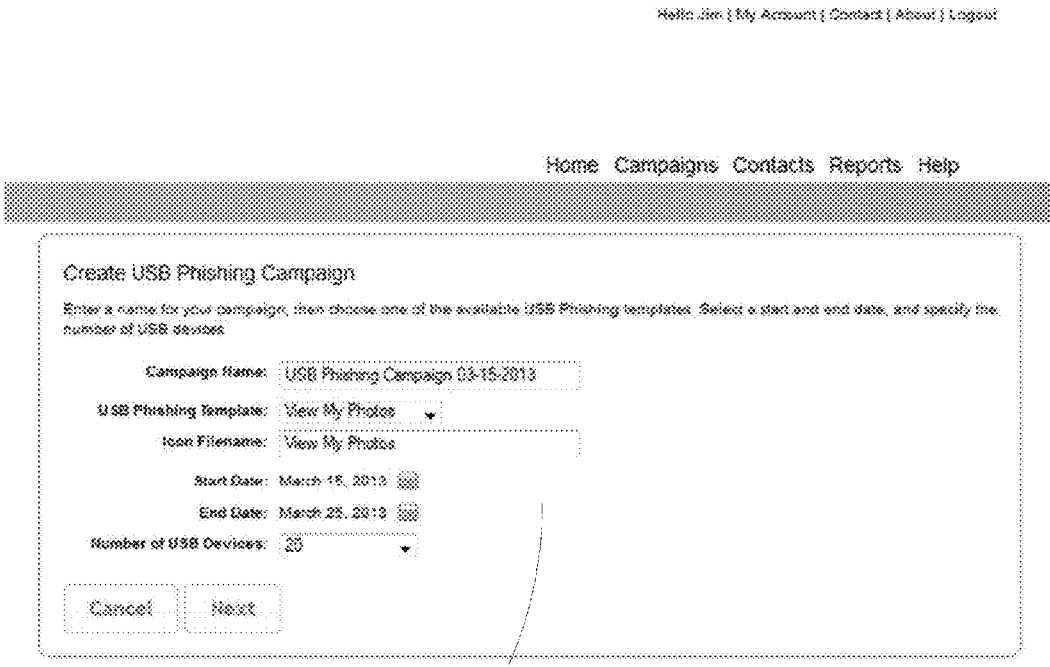
Figure 16:
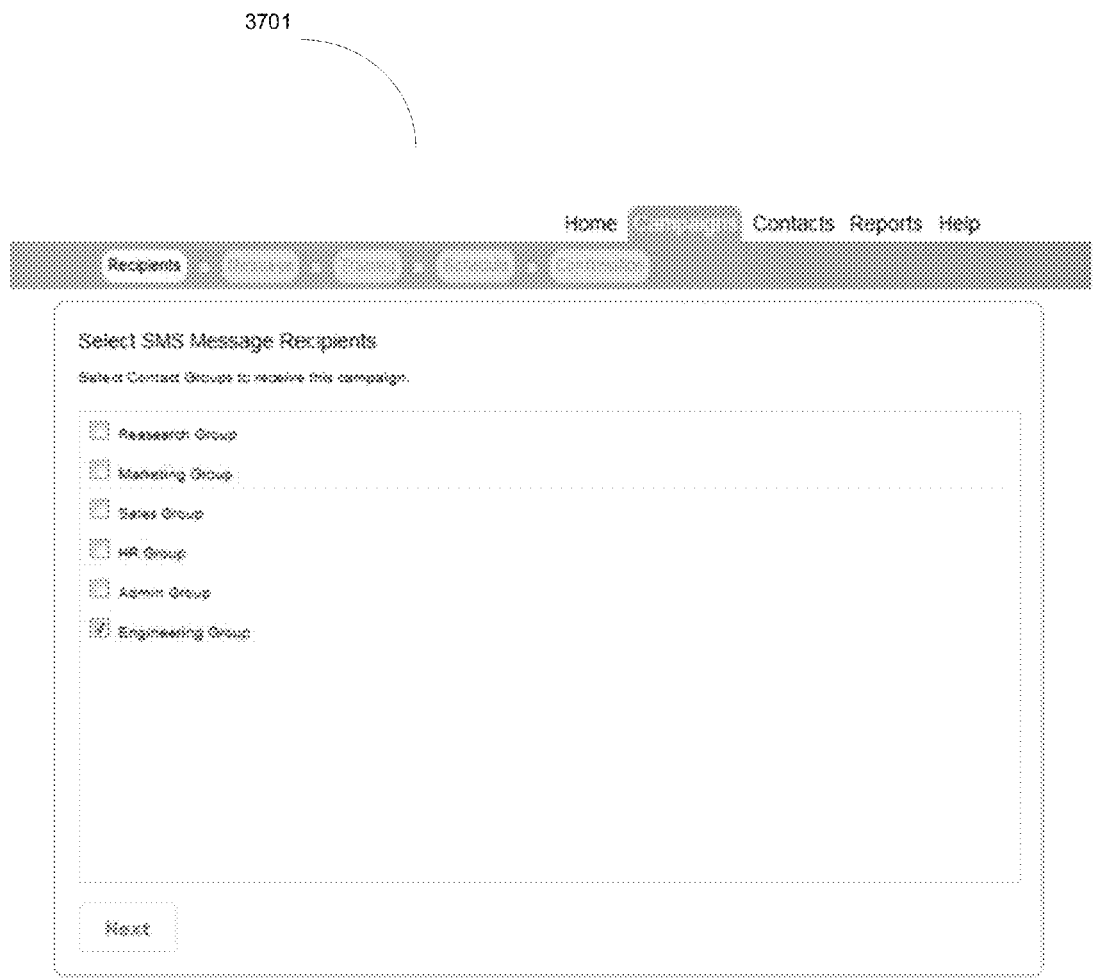

FIG. 11 illustrates a screen 3201 of a possible embodiment of an administrator interface in which the system may assign training modules to a user or group of users. For example, for the "new hire assignment" discussed above, the administrator may use the interface to select or review various training interventions 3203 to assign to the user as part of that assignment. Some training interventions may be assigned automatically by the systems policy manager module, others may be selected by a human system administrator via the user interface, or the training interventions may be selected by a combination of the two (such as by displaying the system-selected interventions and giving the administrator the opportunity to modify or accept them). Selection and customization of training intervention may be based on any suitable rules or criteria, including rules or criteria that rely on data obtained from user profiles or other data available such as training history or behavior data (including information about the very mock attack the user just fell for). When the system or administrator assigns interventions, it may also select and assign start dates and/or times, end dates and/or times, or reminder options. FIG. 15 illustrates an embodiment of a scheduling screen 3601 of a user interface that may enable such selection. These can be variably assigned to individual users or entire groups of users as shown in FIG. 16 which shows a group assignment screen 3701. In the group assignment process, the system may allow the administrator to filter user data and select users to include in a group in several ways. This may include selecting users individually; selecting one or more groups of users; selecting users by training assignments that they may or may not have taken during a particular time interval; selecting users by training intervention that they may or may not have received during a particular time interval; selecting users by type of user activity or user behavior observed during a particular time interval; selecting users according to criteria based on training needs models (e.g., users whose risk for one or more particular threat scenarios is above a particular threshold or a particular combination of thresholds); or selecting users by any other type of relevant data available to the system.

Figure 12:
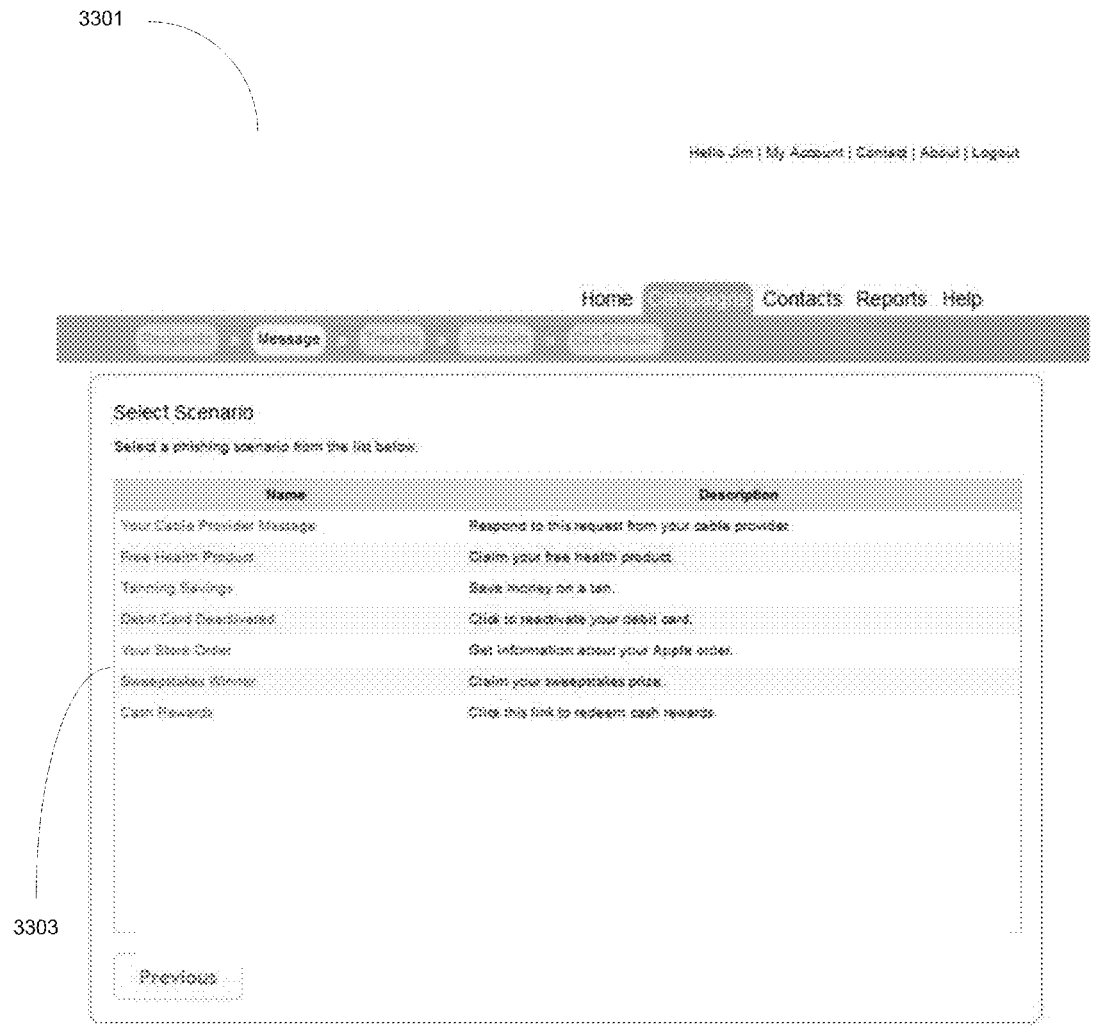

Optionally, the administrator user interface may contain one or more input fields where the administrator can take actions such as customize the training content. This may include creating, selecting from a list, or customizing the content of a particular scenario. As an example, FIG. 12 illustrates a screen of a possible embodiment of an administrator interface 3301 where a user can customize a type of mock SMS attack message by selecting any of various available mock malicious message templates 3303. For example, FIG. 12 shows a list of customizable mock SMS attack templates that includes a message template claiming to be from a cable provider, a message template about a free health product, a message template about a debit card having been deactivated. These templates can be automatically customized by the policy manager or manually configured by a system administrator, where customization may include accessing user profile data to automatically insert the user's first name (possibly using variables that refer to entries in user profiles) and also adding a fake malicious link that points to a webpage responsible for sensing the user's response to the mock attack and for optionally also delivering an appropriately customized training intervention. Other customization elements that may be manually taken care of by the administrator or automated, possibly as part of the code responsible for launching the mock attack itself, include making sure that the phone number used to initiate the mock SMS attack has been whitelisted with the cellphone carriers of the users selected for the campaign. Customization of a mock attack or other training interventions is not limited to accessing user profile data, user behavior data or user historical data. It can also include any data that might be available to an attacker, including an attacker inside the organization. For instance, customization information may be obtained from publicly available social networking information, public profiles posted on the Web, information available in the news, information accessible online, information obtained via social engineering (including an earlier mock attack), information obtained by breaking into a computer system, information obtained from surveillance cameras, information obtained by eavesdropping on someone's conversations, information obtained using spyware, purchased information, information obtained from other people, information obtained through any other combination of plausible sources of information.

Figure 13:
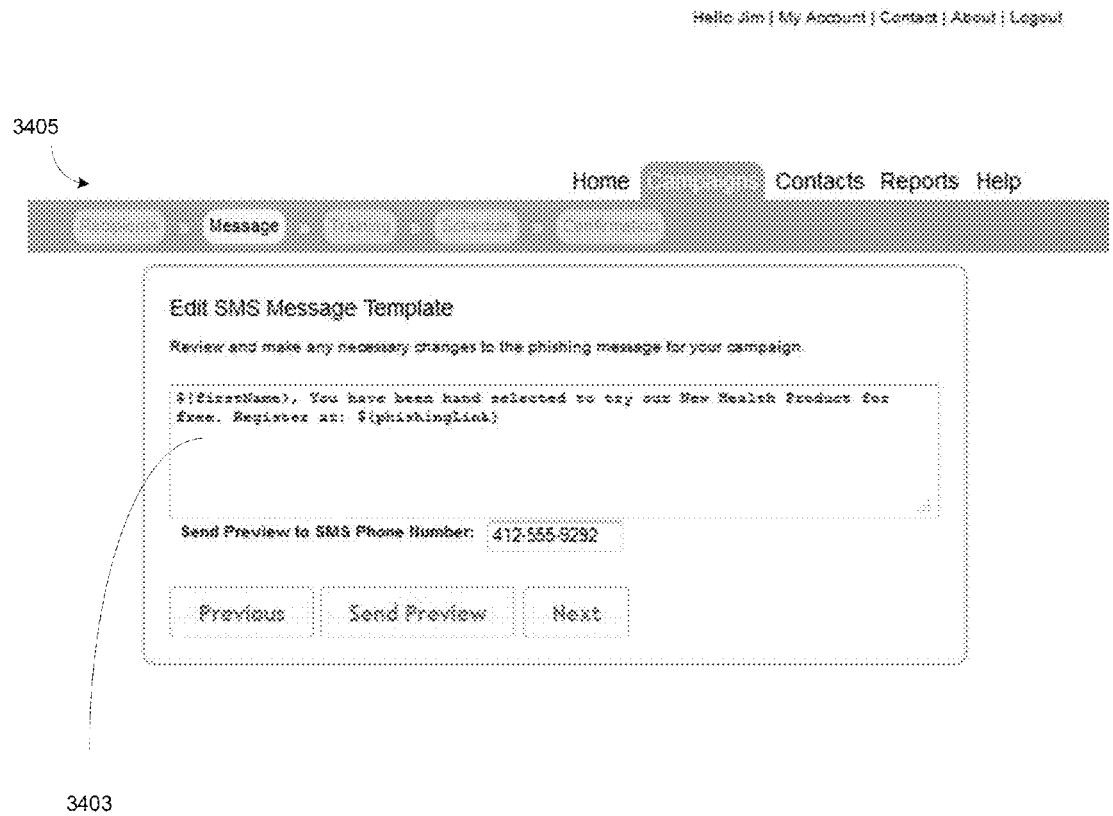

FIG. 13 illustrates an example of a portion of an interface 3403 via which an administrator can enter, upload, or otherwise provide custom content such as the message to be used in a mock SMS attack, involving multiple users. The custom content may include variables that are instantiated by querying relevant sources of information (e.g. first names of targeted users). For example, through this interface the administrator may enter, select, modify and/or verify the user's name, a link (such as a link to a URL or click-to-call functionality), or message text. This interface also may be used to allow the administrator to preview or modify the mock attack or customize mock attack templates. The interface also displays a workflow 3405 that the system may follow when walking the administrator through the setup of a mock attack campaign, including specifying and/or reviewing the recipients of the mock attack campaign, selecting and/or modifying a message to be used in the scenario, reviewing or selecting the training interventions associated with the mock attack campaign, scheduling the campaign, and confirming all parameters.

As described above, the system may assess user vulnerability to different threat scenarios using sensed user response actions to mock attacks, such as users connecting (or not connecting) to mock rogue Wi-Fi access points, users clicking (or not clicking) on links in mock malicious SMS messages, or users connecting (or not connecting) mock malicious USB devices to their computers and/or opening (or not opening) mock malware stored on the mock malicious USB devices. The resulting data may be collected through these mock attacks to estimate the vulnerability of individual users, groups of users with similar characteristics (e.g. users reading their email from smartphones, users who use Wi-Fi outside the corporate network), or an entire population of users.

Mock attack campaigns can be automatically created by the policy manager or can be the result of mixed initiative interaction with a system administrator interface or administrator client, where the mock attack campaigns can be directed at individual users, entire groups of users organized by department, location, role or some other combination of available parameters, where mock campaigns can be subject to customizable scheduling constraints, and user training data and activity/behavior data can be accessed by the system administrator to review the campaign while in progress or after it has been completed. Campaigns can be created by using ready-made mock attack templates, which may offer different levels of customization. Examples include: automatic insertion of the user's name in the administrator-selected template; a selected start time or end time for the administrator-selected training intervention; information obtained from a social network or public profile that is relevant to the user; an administrator-edited SMS message; a name and number of mock malicious files stored on a mock malicious USB; links in an mock malicious SMS message; messaging clients to be used in a particular mock messaging campaign; particular interventions to be used for users falling for a particular mock attack scenario; an administrator-selected link to be inserted in an SMS message such as a click-to-call link or a URL link; and/or an administrator-selected multimedia attachment.

Figure 14:
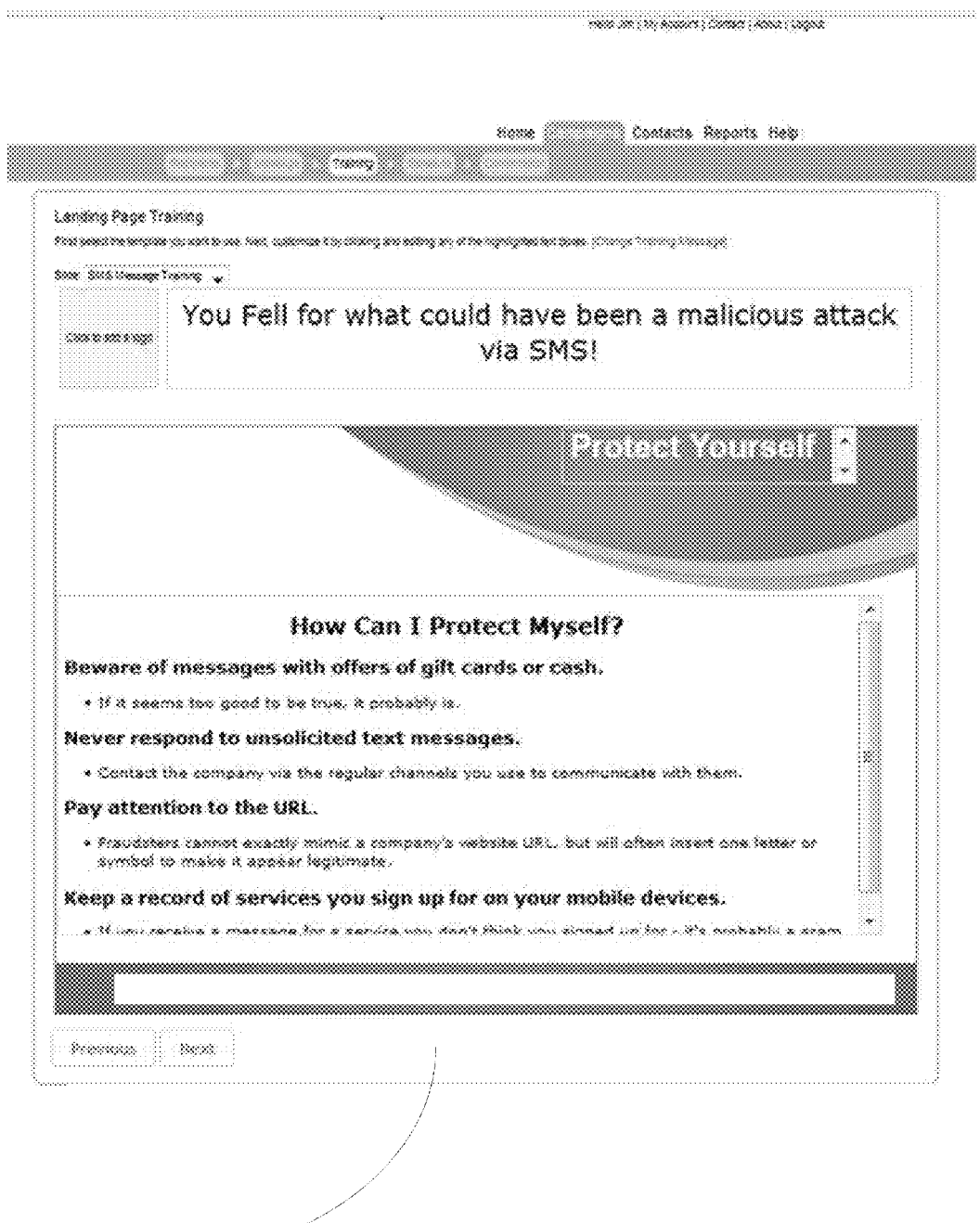

FIG. 14 also illustrates a screen 3503 of an embodiment of an administrator interface that can be used to customize just-in-time training intervention embedded in mock attacks themselves (with the embedded training content being displayed just-in-time if the user falls for the mock attack), or some other type of just-in-time training contend hosted for instance on a landing page to which the user who falls prey to a mock attack is directed. The landing page may be part of the training intervention, and the system may include functionality to allow a system administrator to select and customize the landing page. An example might be a WYSIWYG editor 2503 that enables a system administrator to customize simple training interventions such as that shown in FIG. 15, including the insertion of logos and other relevant customization elements. The system administrator interface also may include a portion that enables the administrator to set up or customize a webpage that senses one or more users' response to the training intervention and provides training information corresponding to the user response.

Different mock attacks may warrant different sets of customizable parameters. For instance, FIG. 15 illustrates how customization of mock USB attacks can also be done using a screen 3601 that enables the administrator to specify the number of USB devices to be used as part of a particular mock USB attack campaign (e.g. number of devices to be dropped off at a tradeshow or at the company's cafeteria). This particular screen also allows the administrator to select among different types of templates that help customize the mock malware to be installed on the USB devices (e.g. names of the files with mock malware, type of mock malware and sensing to be deployed, type of just-in-time training intervention to be optionally embedded with the mock malware). Different file names in different templates may allow administrators to tailor mock attacks and chose whether to lure users to open mock malicious files by promising them to see salaries of fellow employees, annual reviews of their colleagues, or racy pictures of celebrities. With mock malicious USB attacks involving dropping USB memory devices at one or more locations for employees to pick up, the number of devices does not have to match the number of employees targeted in the campaign. Historical training data can be used to automatically determine how many devices to use in a campaign, at which locations to drop these devices, how many devices to drop at different locations, as well as how to customize devices dropped at different locations (e.g. based on the characteristics of people most likely to pick up the devices at different locations). This customization process may be automated, be manual or a combination of the two (e.g. with some parameters being set or suggested by the system and others requiring manual input). Screen 3601 also illustrates how scheduling constraints can also be suggested to administrator, with the administrator having the option to modify them. This can include scheduling parameters such as start times and end times of a mock attack campaign. The system may then launch a process that leads to the customization and deployment of the mock malicious USB devices according to those scheduling constraints.

In the USB scenario, administrative console functionality can also be provided for administrators to preview the content to be installed on different USB devices, including just-intime training interventions, prior to launching the process responsible for downloading the content on the USB devices and for initiating the distribution of the devices. More generally, knowledge about the devices' different users can also be used to customize some of the sensing functionality required to sense the response of different users to different mock attacks (e.g. differentiating between different types of messaging clients used by different users on their cell phones, or differentiating between different types of mobile devices users rely on). In addition, computer devices used by different users can also be instrumented to facilitate the sensing process (e.g. by installing sensing software on the smartphones of users to detect their response to phone-oriented attacks). In some embodiments, this may include the installation of Mobile Device Management (MDM) clients on smartphones for instance.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

The invention claimed is:

1. A cybersecurity training system, comprising:
one or more data storage devices that store:
at least one cybersecurity training intervention, and
a training needs model;
an electronic device comprising one or more sensors that sense data relating to behavior or activity of at least one user of the electronic device, wherein the one or more sensors comprise one or more of the following:
a USB device sensor configured to detect when a USB drive has been connected to the electronic device,
a Wi-Fi sensor configured to detect a Wi-Fi access point to which the electronic device is connected, or
a Wi-Fi sensor configured to detect whether the at least one user has attempted to connect the electronic device to a mock rogue Wi-Fi access point;
an analysis host computer comprising a computer-readable memory portion holding programming instructions that, when executed, instruct one or more processors of the analysis host computer to implement a policy manager that:
receives the sensed data from the electronic device via a communications network;
analyzes the sensed data by applying the training needs model to the sensed data to determine whether the at least one user may be at risk for a threat scenario, and
identifies, from the at least one cybersecurity training intervention, a set of one or more policy manager-identified cybersecurity training interventions that are relevant to the threat scenario;
a computer-readable memory portion holding programming instructions that, when executed, instruct one or more processors to implement a system administrator interface that displays the set of one or more policy manager-identified cybersecurity training interventions and receives a selection of an intervention in the set via the system administrator interface; and
a computer-readable memory portion holding programming instructions that, when executed, instruct one or more processors to generate a command to deliver the selected cybersecurity training intervention to an electronic device for presentation to the at least one user.

2. The system of claim 1, wherein the instructions that implement the system administrator interface also comprise instructions to receive a customization of the selected cybersecurity training intervention via the system administrator interface.

3. The system of claim 1, wherein the instructions that implement the system administrator interface also comprise instructions to display parameters of the training needs model, and receive a customization of the training needs model via the system administrator interface.

4. The system of claim 1, wherein the instructions that implement the system administrator interface also comprise instructions to display logic of the policy manager, and receive a configuration of the policy manager via the system administrator interface.

5. The system of claim 1, wherein the instructions that implement the system administrator interface also comprise instructions to display analysis results from the policy manager and receive a manipulation of the analysis results-via the system administrator interface.

6. The system of claim 1, wherein:
the instructions to implement the system administrator interface also comprise instructions to:
display, via the system administrator interface, statistics for a plurality of additional users, and
receive, via the system administrator interface, a selected group of the additional users; and
the system further comprises a computer-readable memory portion holding programming instructions that, when executed, instruct one or more processors to generate a command to deliver the selected cybersecurity training intervention to the selected group of the additional users.

7. The system of claim 1, wherein:
the threat scenario comprises an SMS attack threat scenario; and
the instructions to implement a system administrator interface that receives a customization for the selected cybersecurity training intervention comprise instructions to:
display, via the system administrator interface, a plurality of SMS attack templates,
receive, via the system administrator interface, a selection of one of the displayed SMS attack templates, and
apply the customization to the selected template so that the customization comprises one or more of any of the following:
automatic insertion of the user's name in the administrator-selected template;
a selected start time or end time for the selected cybersecurity training intervention;
information obtained from a social network or public profile that is relevant to the user;
link selected via the system administrator interface; or
an SMS message edited via the system administrator interface.

8. The system of claim 1, wherein:
the threat scenario comprises use of a malicious memory device; and
the instructions to implement the system administrator interface that receives a customization for the selected training intervention comprise instructions to:
display, via the system administrator interface, a plurality of mock malicious memory device attack templates,
receive, via the system administrator interface, a selection of one of the displayed mock malicious memory device attack templates, and apply the customization to the selected template so that the customization comprises a selection of mock malware to include on at least one memory device that will be used in the training intervention.

9. The system of claim 8, wherein the instructions to implement the system administrator interface that receives a customization of the selected training intervention also comprise instructions to receive any the following:
one or more locations at which the devices are to be delivered; or
a selection of mock malware to include on the devices.

10. The system of claim 2, wherein:
the instructions to implement the system administrator interface also comprise instructions to:
display, via the system administrator interface, identification information for a plurality of additional users,
receive, via the system administrator interface, a selected group of the additional users, and
receive the customization such that different mock attacks are provided to various members of the selected group; and
the system further comprises a computer-readable memory portion holding programming instructions that, when executed, instruct one or more processors to generate a command to deliver the selected cybersecurity training intervention with the customization to the selected group of additional users.

11. The system of claim 1, wherein:
the instructions to implement the system administrator interface also comprise instructions to implement a user interface portion that enables receipt of a selection of:
one or more scheduling constraints for the selected training intervention, and
one or more additional users to whom the selected training intervention will be delivered; and
the system further comprises a computer-readable memory portion holding programming instructions that, when executed, instruct one or more processors to generate a command to deliver the selected cybersecurity training intervention to the additional users in accordance with the scheduling constraints.

12. A method of providing an administrator interface for a cybersecurity training system, comprising:
maintaining, on one or more data storage devices, one or more training interventions and a training needs model;
by one or more sensors of an electronic device, sensing data relating to behavior or activity of at least one user of the electronic device, wherein the one or more sensors comprise one or more of the following:
a USB device sensor configured to detect when a USB drive has been connected to the electronic device,
a Wi-Fi sensor configured to detect a Wi-Fi access point to which the electronic device is connected, or
a Wi-Fi sensor configured to detect whether the at least one user has attempted to connect the electronic device to a mock rogue Wi-Fi access point; and
by a processor of an analysis host computer:
receiving the sensed data from the one or more sensors via a communication network,
applying the training needs model to the received data to determine whether the at least one user may be at risk of a threat scenario,
identifying one or more of the training interventions that are relevant to the threat scenario,
displaying, via the system administrator interface, the identified one or more training interventions,
receiving, via the system administrator interface, a selection of a displayed cybersecurity training intervention, and
generating a command to deliver the selected cybersecurity training intervention to an electronic device for output to the at least one user.

13. The method of claim 12, further comprising, by the processor:
receiving, via the system administrator interface, a customization for the selected training intervention; and
when generating the command to deliver the selected training intervention to the user, generating a command to deliver the customization of the selected training intervention.

14. The method of claim 12, further comprising, by the processor, causing the system administrator interface to perform one or more of the following:
display parameters of the training needs model, and receive a customization of the training needs model via the system administrator interface;
display logic of the policy manager, and receive a configuration of the policy manager via the system administrator interface; or
display an output of data from the policy manager and receive a manipulation of the output data via the system administrator interface.

15. The method of claim 12, further comprising, by the processor:
causing the system administrator interface to:
display, via the system administrator interface, statistics for a plurality of additional users, and
receive, via the system administrator interface, a selected group of the additional users; and
generating a command to deliver the selected training intervention to the selected group of the additional users.

16. The method of claim 15, further comprising, by the processor, causing the system administrator interface to display the statistics so that the statistics are presented, sorted and/or compiled according to criteria that are selected via the system administrator interface.

17. The method of claim 12, wherein:
the threat scenario comprises an SMS attack threat scenario; and
receiving the customization for the selected training intervention comprises:
displaying, via the system administrator interface, a plurality of SMS attack templates,
receiving, via the system administrator interface, a selection of one of the displayed SMS attack templates, and
applying the customization to the selected template so that the customization comprises one or more of any of the following:
automatic insertion of the at least one user's name in the template;
a selected start time or end time for the administrator-selected training intervention;
information obtained from a social network or public profile that is relevant to the at least one user; or
an SMS message edited via the system administrator interface.

18. The method of claim 12, wherein:
the threat scenario comprises use of a malicious memory device; and
receiving the customization for the selected training intervention comprises:

displaying, via the system administrator interface, a plurality of mock malicious memory device attack training templates, receiving, via the system administrator interface, a selection of one of the displayed mock malicious memory device attack training templates, and applying the customization to the selected template so that the customization comprises a selection of mock malware to include on one or more memory devices that will be used in the training intervention.

19. The method of claim 12, wherein receiving the customization for the selected training intervention also comprises receiving one or more of any the following:

one or more locations at which the one or more devices are to be delivered, or a selection of mock malware to include on the devices.

20. The method of claim 12, further comprising:

displaying, via the system administrator interface, identification information for a plurality of additional users;

receiving, via the system administrator interface, a selected group of the additional users;

receiving the customization such that different mock attacks are provided to various members of the selected group; and generating a command to deliver the selected training intervention with the customization to the selected group of the additional users.

21. The method of claim 12, further comprising implementing a portion of the system administrator interface that enables receipt of a selection of:

one or more scheduling constraints for the selected training intervention; and one or more additional users to whom the selected training intervention will be delivered;

wherein the instructions also include instructions to generate a command to deliver the selected cybersecurity training intervention to the electronic device in accordance with the scheduling constraints.

22. A method of providing an administrator interface for a cybersecurity training system, comprising:

maintaining, on one or more data storage devices, at least one cybersecurity training intervention;

by one or more sensors of an electronic device, receiving data relating to behavior or activity of at least one user of the electronic device, wherein the one or more sensors comprise one or more of the following:

a USB device sensor configured to detect when a USB drive has been connected to the electronic device, a Wi-Fi sensor configured to detect a Wi-Fi access point to which the electronic device is connected, or a Wi-Fi sensor configured to detect whether the at least one user has attempted to connect the electronic device to a mock rogue Wi-Fi access point; and by a processor of an analysis host computer; and by a processor of an analysis host computer:

receiving the data from the electronic device via a communication network, applying a training needs model to the received data to determine whether the at least one user may be at risk for a threat scenario, displaying, via a system administrator interface, a representation of a measurement of whether the at least one user may be at risk for the threat scenario, identifying one or more of the cybersecurity training interventions that are relevant to the threat scenario, displaying, via the system administrator interface, the identified one or more cybersecurity training interventions, receiving, via the system administrator interface, a selection of one of the displayed cybersecurity training interventions, receiving a customization for the selected cybersecurity training intervention, and generating a command to deliver the selected cybersecurity training intervention with the customization to an electronic device for presentation to the at least one user.

23. The method of claim 22, further comprising:

displaying, via the system administrator interface, identification information for a plurality of additional users;

receiving, via the system administrator interface, a selected group of the additional users; and generating a command to deliver the selected cybersecurity training intervention with the customization to the selected group of the additional users.

24. The method of claim 22, further comprising implementing a user interface portion of the system administrator interface that enables receipt of a selection of:

one or more scheduling constraints for the selected cybersecurity training intervention; and an identification of one or more additional users to whom the selected cybersecurity training intervention will be delivered;

wherein the instructions also include instructions to generate a command to deliver the selected cybersecurity training intervention with the customization to the additional users in accordance with the scheduling constraints.

25. A cybersecurity training system, comprising:

one or more data storage devices that store:

at least one training intervention, and a training needs model;

an electronic device comprising one or more sensors that sense data relating to behavior or activity of at least one user of the electronic device, wherein the one or more sensors comprise one or more of the following:

a USB device sensor configured to detect when a USB drive has been connected to the electronic device, a Wi-Fi sensor configured to detect a Wi-Fi access point to which the electronic device is connected, or a Wi-Fi sensor configured to detect whether the at least one user has attempted to connect the electronic device to a mock rogue Wi-Fi access point;

an analysis host computer comprising one or more processors and a computer-readable memory portion holding programming instructions that, when executed, instruct the one or more processors of the analysis host computer to implement a policy manager that:

receives the sensed data from the electronic device via a communication network, and analyzes the sensed data relating to at least one user by applying the training needs model to the sensed data to determine whether the at least one user may be at risk for a threat scenario; and a computer-readable memory portion holding programming instructions that, when executed, instruct one or more processors to implement a system administrator interface that is configured to perform at least one of the following actions:

display parameters of the training needs model and receive a customization of the training needs model via the system administrator interface, or display logic of the policy manager and receive a configuration of the logic the system administrator interface;

wherein the system is also configured to, upon completion of at least one of the actions of the system administrator interface:

select one or more of the training interventions that are relevant to the threat scenario, and generate a command to deliver the selected training intervention to an electronic device for presentation to the at least one user.

26. The system of claim 25, wherein the system administrator interface is also configured to perform at least one of the following actions:

display the one or more selected training interventions and allow the administrator to select a subset to be delivered; or receive, via the system administrator interface, a customization of one of the training interventions to be delivered.

27. The system of claim 25, wherein:

the instructions to implement the system administrator interface also comprise instructions to:

display, via the system administrator interface, statistics for a plurality of additional users, and receive, via the system administrator interface, a selected group of the additional users; and the instructions to generate the command also comprise instructions to generate a command to deliver the selected training intervention to the selected group of the additional users.

28. The system of claim 27, wherein the instructions to implement the system administrator interface also comprise instructions to display the statistics so that the administrator can have the statistics presented, sorted and/or compiled according to selected criteria.

* * * * *